US011483272B2

(12) United States Patent
Klink et al.

(10) Patent No.: US 11,483,272 B2
(45) Date of Patent: Oct. 25, 2022

(54) AUTOMATED INTERNET PROTOCOL (IP) WARMING

(71) Applicant: salesforce.com, inc., San Francisco, CA (US)

(72) Inventors: Tamara Klink, Sydney (AU); Daniel Luke Powney, Melbourne (AU)

(73) Assignee: Salesforce, inc., San Francisco, CA (US)

( * ) Notice: Subject to any disclaimer, the term of this patent is extended or adjusted under 35 U.S.C. 154(b) by 266 days.

(21) Appl. No.: 16/712,546

(22) Filed: Dec. 12, 2019

(65) Prior Publication Data

US 2021/0184999 A1    Jun. 17, 2021

(51) Int. Cl.
| | | |
|---|---|---|
| *G06F 15/16* | (2006.01) | |
| *H04L 51/226* | (2022.01) | |
| *H04L 51/48* | (2022.01) | |
| *H04L 51/216* | (2022.01) | |
| *H04L 51/234* | (2022.01) | |
| *H04L 67/50* | (2022.01) | |

(52) U.S. Cl.
CPC .......... *H04L 51/226* (2022.05); *H04L 51/216* (2022.05); *H04L 51/234* (2022.05); *H04L 51/48* (2022.05); *H04L 67/535* (2022.05)

(58) Field of Classification Search
CPC ......... H04L 51/26; H04L 51/16; H04L 51/28; H04L 51/34; H04L 67/22; H04L 51/226; H04L 51/216; H04L 51/234; H04L 51/48; H04L 67/535
USPC .................................................. 709/206, 224
See application file for complete search history.

(56) References Cited

U.S. PATENT DOCUMENTS

| | | | | |
|---|---|---|---|---|
| 2006/0253537 | A1* | 11/2006 | Thomas | .................. H04L 67/22 709/206 |
| 2011/0252107 | A1* | 10/2011 | Chestnut | ................ G06Q 10/00 709/206 |
| 2011/0258218 | A1* | 10/2011 | Hayes | .................. G06Q 10/107 707/769 |
| 2012/0191546 | A1* | 7/2012 | Phelan | ................. G06Q 10/107 705/14.67 |
| 2014/0100952 | A1* | 4/2014 | Bart | .................... G06Q 30/0255 705/14.53 |
| 2015/0019910 | A1* | 1/2015 | Simon | ................. G06F 11/1402 714/16 |

(Continued)

*Primary Examiner* — Johnny B Aguiar
(74) *Attorney, Agent, or Firm* — Holland & Hart LLP

(57) ABSTRACT

A method, apparatus, and system for internet protocol (IP) warming is described. Some systems may send large volumes of communication messages from a single IP address. If the IP address does not have a strong sender reputation, these emails may be sent to spam folders or blocked, and the IP address may be blacklisted. To build a strong sender reputation, a user may implement an IP warming plan for the IP address. To support automated IP warming, an application may identify a target number of communication messages to transmit from the IP address, retrieve communication information for a target set of devices, generate, for the IP address, a set of transmission thresholds corresponding to a set of time durations for transmitting communication messages based on the target number of communication messages and the communication information, and transmit a set of communication messages based on the set of transmission thresholds.

20 Claims, 12 Drawing Sheets

(56) References Cited

U.S. PATENT DOCUMENTS

| | | | |
|---|---|---|---|
| 2015/0350376 A1* | 12/2015 | Vijay | H04L 67/325 |
| | | | 709/204 |
| 2015/0381552 A1* | 12/2015 | Vijay | H04L 43/08 |
| | | | 709/206 |
| 2016/0205054 A1* | 7/2016 | Lu | H04L 51/32 |
| | | | 709/206 |
| 2017/0134322 A1* | 5/2017 | McQuillen | H04L 51/22 |
| 2018/0219820 A1* | 8/2018 | Kramer | G06Q 30/0248 |
| 2019/0213476 A1* | 7/2019 | Singh | G06N 3/08 |
| 2019/0370827 A1* | 12/2019 | Shah | H04L 51/046 |
| 2020/0137008 A1* | 4/2020 | Jin | H04L 51/046 |
| 2020/0322307 A1* | 10/2020 | Zhang | H04L 51/32 |

\* cited by examiner

AUTOMATED INTERNET PROTOCOL (IP) WARMING

FIELD OF TECHNOLOGY

The present disclosure relates generally to database systems and data processing, and more specifically to automated internet protocol (IP) warming.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support an email service provider (ESP) associated with an internet protocol (IP) address. The ESP may send emails or other communications to a number of recipients, where the IP address of the source system is identified as the "sender" of the emails or other communications. Such communications, however, may be delayed, blocked, or otherwise bounce when sent to the recipients if the IP address associated with the ESP is not recognized by an internet service provider (ISP) associated with the recipients or if the IP address does not have a good reputation with the ISP. Establishing a good reputation for the IP address (i.e., "warming" the IP address) with one or more ISPs may be complex, time consuming, and expensive.

DETAILED DESCRIPTION

Figure 1:
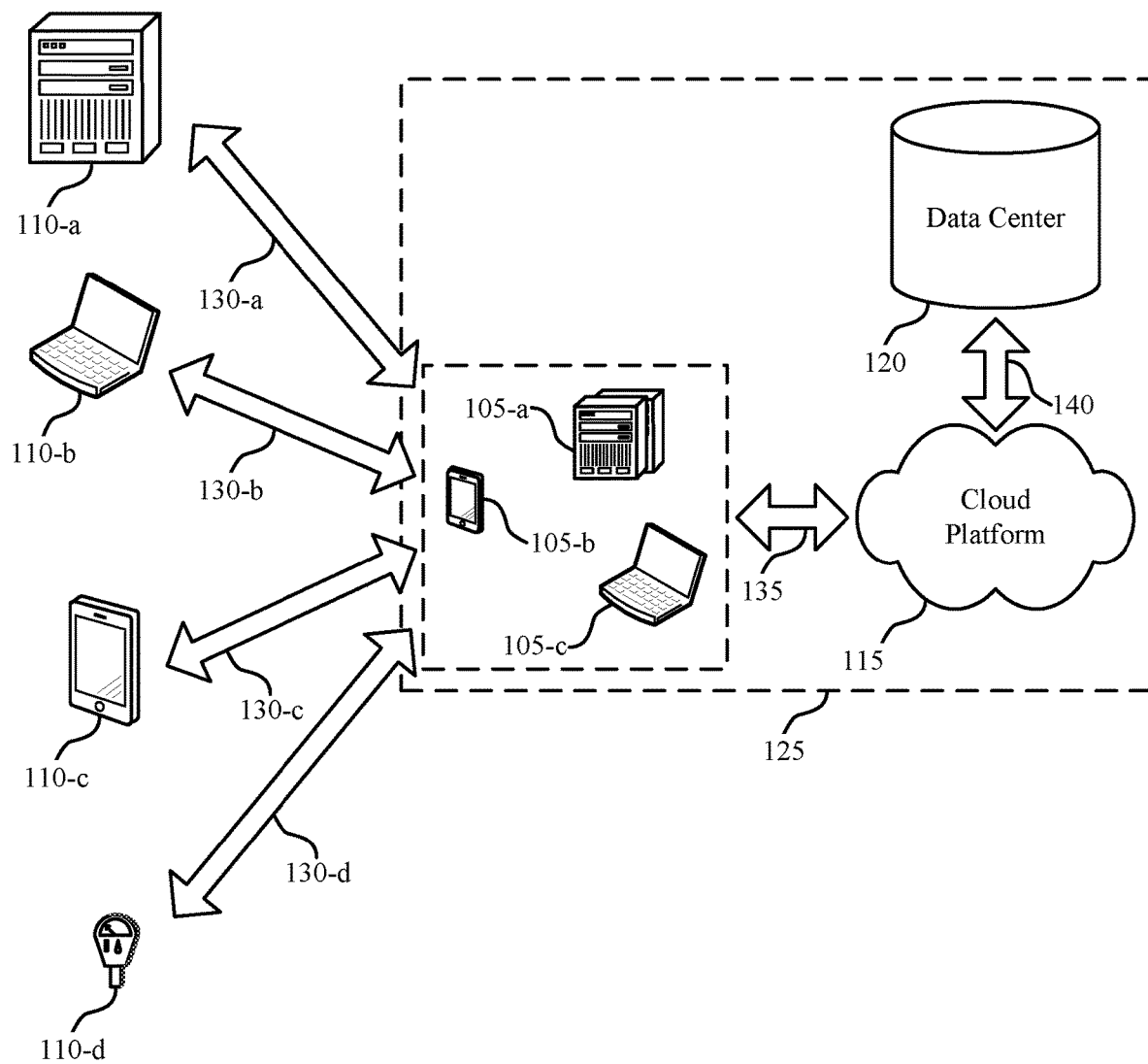
FIGS. 1 and 2 illustrate examples of systems that support automated internet protocol (IP) warming in accordance with aspects of the present disclosure.

Some systems (e.g., customer relationship management (CRM) systems, email service provider (ESP) systems, etc.) may support internet protocol (IP) warming. IP warming may involve building the reputation of an IP address as a trusted sender of communications such that an internet service provider (ISP) receiving communication messages from the IP address will deliver the communication messages to the intended recipient(s). For effective IP warming, a user may gradually increase a communication message (e.g., email) send volume from the IP address to mitigate damage to the sender's reputation. However, establishing a good reputation for the IP address (i.e., "warming" the IP address) with one or more ISPs may be complex, time consuming, and expensive. Additionally, static IP warming plans may fail to respond to changes to email reception (e.g., blocked emails, spamtraps, blacklists, etc.) in real time or pseudo-real time.

As described herein, a system may implement automated IP warming to improve the efficiency of building a sender's reputation while proactively managing the deliverability of communication messages (e.g., emails). Automated IP warming may be used to create IP warming plans which may implement and schedule communication transmissions on a predetermined or dynamic basis while reducing common communication mistakes and limiting transmissions of the communications, such as emails, to invalid recipient addresses. Additionally, an IP warming plan generated as part of an automated IP warming application may use predetermined rules and artificial intelligence or machine learning to tailor the IP warming plan to specific recipients and communication campaigns. The IP warming plan may provide user interfaces for intuitive interaction with the IP warming plan by a user and may generate notifications, alerts, and deliverability reports for review by the user. Additionally, the IP warming plan may generate recommendations and insights based on feedback received from transmission and delivery of the communications to further enhance success of delivery and recipient interaction with the communications.

Techniques are described herein for automated IP warming using an automated analytics application including a user interface to generate an IP warming plan. The techniques may facilitate scheduling one or more communication message transmissions to effectively and efficiently warm an IP address. Effectively warming the IP address may result in an improved level of success in relation to delivery of the communication messages and interaction with the communication messages by a target number of recipients. The automated IP warming system may integrate with portions of a cloud-based system and/or other inbox placement systems. Additionally, the automated IP warming system may receive and implement feedback in real time to more efficiently modify parameters of the IP warming plan. The IP warming system may support any amount of ISP-specific functionality, such that the automated IP warming system may separately adjust communication message transmission schedules for different ISPs, determine ISP-specific machine learned models, create ISP-specific rules for IP warming, or perform any combination of these functions.

Aspects of the disclosure are initially described in the context of an environment supporting an on-demand database service. Aspects of the disclosure are additionally described with reference to IP warming systems, process flows, and decision trees. Aspects of the disclosure are further illustrated by and described with reference to apparatus diagrams, system diagrams, and flowcharts that relate to automated IP warming.

FIG. 1 illustrates an example of a system 100 that supports automated IP warming in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and the cloud client 105 may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Techniques are described herein for automated IP warming using an automated analytics application including a user interface to generate an IP warming plan. The techniques may provide for an IP warming plan that schedules one or more communication message transmissions to facilitate effectively and efficiently warming an IP address. Warming the IP address may support an improved level of successful delivery of communication messages, more frequent interaction with the communication messages by a target number of recipients, or a combination thereof. The automated IP warming system may integrate with portions of a cloud-based system and other inbox placement systems. Additionally, the automated IP warming system may receive and implement feedback in real time to more efficiently modify parameters of the IP warming plan.

In some other systems, a user may manually create an IP warming plan for an IP address. Manual creation of an IP warming plan may fail to account for important segments of data, deliverability issues provided by feedback, and real time changes. For example, a user may create an IP warming plan based on a target number of emails to send. However, the user may not account for the domain split (e.g., between different ISPs receiving the emails) of the target recipients. Different ISPs may implement different rules or reputation determination factors to which a static, user-created IP warming plan cannot adapt. As such, the user-created IP warming plan may lead to a bad reputation—and, correspondingly, spamtraps or blacklisting—by particular ISPs based on unregulated send volumes between different ISPs and a lack of real time feedback. Additionally or alternatively, a user may send over a recommended send volume, leading to a bad sender reputation. A bad reputation may result in deliverability issues, which can become expensive to fix. For example, rebuilding a sender's reputation may take a long time, resulting in inefficient send volumes for large periods of time. Depending on the severity of the deliverability issues, a user may need to start again from scratch and purchase a new IP address, resulting in further inefficiencies. Additionally, some other systems may support adding IP addresses to an established IP address pool by throttling messages sent by the added IP addresses. However, such systems may not support ramping up a new IP address unassociated with an existing IP address pool. Furthermore, users may be unable to extract feedback (e.g., relating to invalid, blocked, or bounced emails) from their ESP, such that the users may be unable to determine if their sender reputation is dropping. Accordingly, the users may not be able to adapt IP warming plans based on feedback.

In contrast, the system 100 may support automated IP warming that involves handling domain splits between ISPs and dynamically updating an IP warming plan based on deliverability feedback. For example, an automated IP warming application (e.g., a deliverability application) may segment target audiences based on domain splits and engagement history to achieve an IP warming goal. Specifically, the automated IP warming application may manage ISP-specific models, rules, and/or transmission schedules based on the domain splits. Additionally, the automated IP warming application may automatically respond to any deliverability issues during IP warming and may tailor IP warming plans to avoid further damage to a sender's reputation. As such, the system 100 may more efficiently and effectively generate, tailor, and modify IP warming processes—including IP warming plans—by using a set of steps and sets of data received from current and past communication sends. In some examples, the automated IP warming may include implementation of IP warming plans that utilize historical insights and recipient feedback data to dynamically alter communication message transmissions. These dynamic updates may reduce a rejection rate of the communication messages and of the IP address itself by the recipients' ISPs. By implementing the automated IP warming plan, the user experience and success rate for warming IP addresses may improve (e.g., as compared to a static, user-created IP warming plan) by more efficiently and effectively making changes to the IP warming plan based on feedback garnered from previously sent communication messages.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
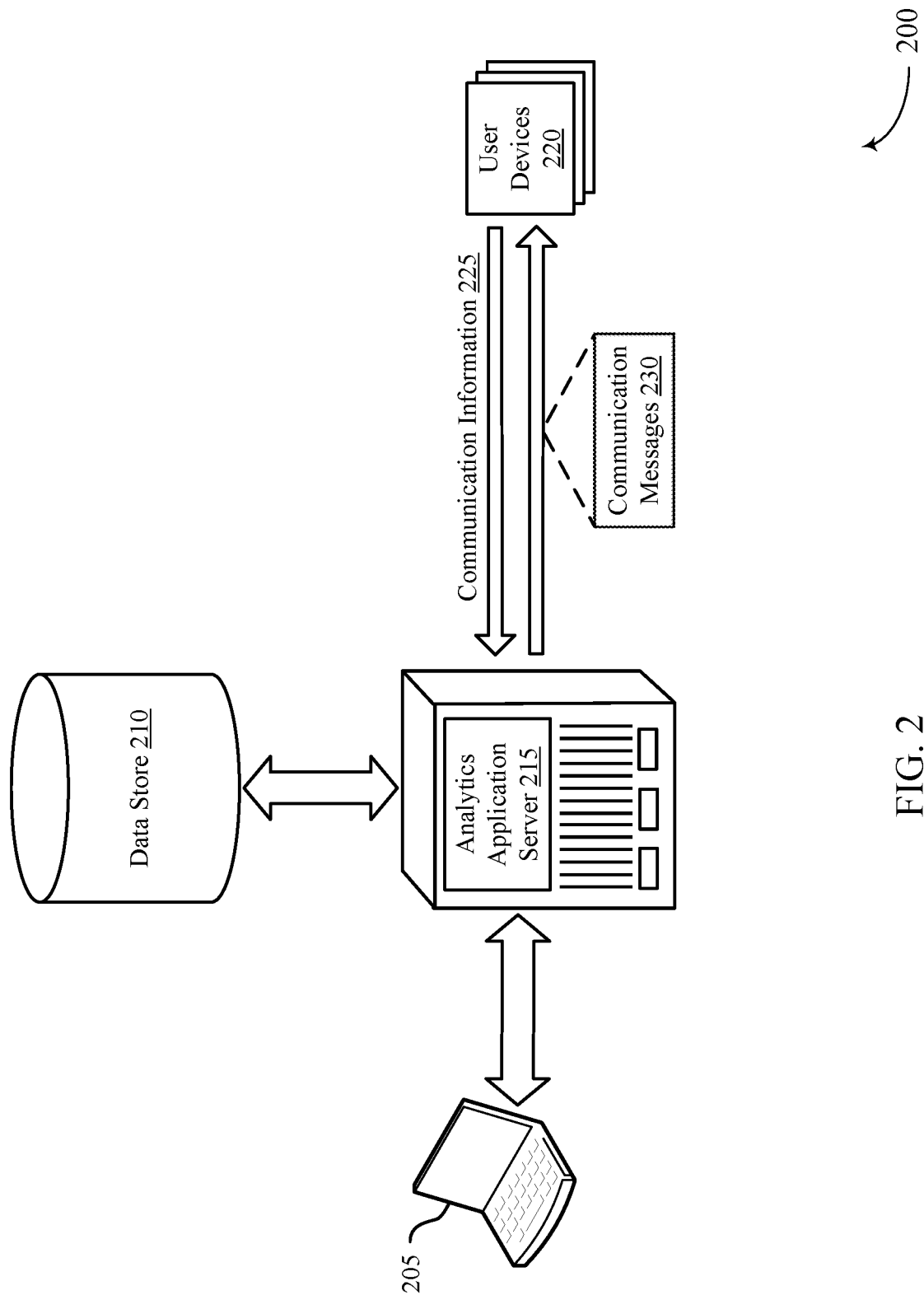

FIG. 2 illustrates an example of a system 200 that supports automated IP warming in accordance with aspects of the present disclosure. The system 200, which may be an example of a system for data processing, includes a user device 205, a data store 210, an analytics application server 215, and a set of user devices 220. The system 200 may implement aspects of the system 100 as described with reference to FIG. 1. For example, the analytics application server 215 may be an example or component of a cloud client 105 (e.g., a server). The analytics application server 215 may be an example of a single server, a server cluster, a database server, a cloud-based server, a virtual machine, a container, or any other device or system that supports data processing. Additionally, the user device 205 and set of user devices 220 may be examples of cloud clients 105 or contacts 110, and the data store 210 may implement aspects of one or more of the data center 120 or cloud platform 115 as described with reference to FIG. 1, for example.

The analytics application server 215 may be an example of an analytics platform for creating, reviewing, revising, and implementing IP warming plans and may leverage machine learning techniques. The user device 205 may be in communication with the analytics application server 215 and may store and transmit data related to the IP warming plans or data related to the user devices 220 and a set of communication messages 230 and communication information 225. The user device 205 may present information related to the IP warming plans to a user via a user interface and may solicit input from the user regarding creation, performance, and maintenance of the IP warming plans.

The analytics application server 215 may be in communication with the set of user devices 220 and transmit a set of communication messages 230 to the set of user devices 220 in accordance with the IP warming plans. For example, the analytics application server 215 may automatically push or throttle communication messages 230 (e.g., emails) according to a transmission schedule of an IP warming plan. In some cases, the automatic pushing or throttling of communication messages 230 may be specific to one or more ISPs. In other examples, the analytics application server 215 may suggest a transmission schedule to the user device 205, and the user device 205 may send the communication messages 230 to the set of user devices 220 according to the transmission schedule and one or more user inputs.

In some cases, the analytics application server 215 may receive communication information 225 from the set of user devices 220 (e.g., as feedback in response to the transmitted communication messages 230). In some examples, the communication information 225 may be related to actions taken by the set of user devices 220 in relation to the communication messages 230 (e.g., whether a communication message 230 is viewed at a user device, is responded to by a user device, etc.). In some cases, the analytics application server 215 may additionally or alternatively retrieve historical communication information for the set of user devices 220—or a population of user devices—from the data store 210. The analytics application server 215 may generate or update an IP warming plan based on the communication information 225. In some examples, the generation, updating, or both of the IP warming plan may be tailored to a particular ISP. For example, the analytics application server 215 may develop different IP warming strategies for different ISPs based on best practices, where the best practices may change according to results received at the analytics application server 215 (e.g., feedback from the user devices 220, feedback from the user device 205, or both).

An IP warming plan may allow a sender (e.g., a user sending emails via an ESP) to convince ISPs that the sender is trusted to send mass communication messages (e.g., mass emails). A sender may be trusted based on a reputation score for the sender. Each ISP may track a reputation score for each sender, where an ISP uses the IP address from the source system of a communication message to identify the sender. An ISP may deliver communication messages for a sender if the sender's reputation score is above some threshold. For example, a sender's reputation may control access to a recipient's inbox: a bad reputation may cause the sender's emails to be sent to a spam folder or to be blocked, while a good reputation may cause the sender's emails to be sent to the recipient's inbox. A sender's reputation may be based on an email address quality, spamtraps, blacklists, authentication methods, spam complaints, email engagement history, or some combination of these or other relevant parameters. ISPs may be suspicious of emails from new IP addresses with no communication history. Accordingly, if a user or organization purchases a new IP address, the sender's reputation may initially be poor (e.g., corresponding to a negative-to-neutral sending reputation). The sender may implement an IP warming plan to gradually increase email send volumes for the new IP address without damaging the sender's reputation. For example, the IP warming plan may restrict daily and/or weekly send volumes to build trust and a positive reputation with one or more ISPs. Additionally or alternatively, if an existing IP address plans to send a large target volume of emails (e.g., that represents a significant increase compared to a typical email send volume for the existing IP address), the sender may implement an IP warming plan to gradually build up to the large target volume of emails (e.g., hundreds of thousands of emails).

The analytics application server 215 may use artificial intelligence machine reinforcement learning for IP warming. For example, the analytics application server 215 may predict IP warming issues with one or more ISPs prior to increasing an IP address's sending volume. Based on a current state, the analytics application server 215 may determine an action to perform (e.g., a threshold number of communication messages to send). The state may include feedback loop data for a previous time period (e.g., the last day, the last week, the last month, or some combination thereof), a percentage of opens, clicks, and/or bounces for sent emails, email inbox placement, blocked emails, or some combination of these or other feedback parameters. The state may additionally or alternatively include the current sender reputation score (or an estimation of the current sender reputation score) for one or more ISPs, a send volume data range, or some combination thereof. The analytics application server 215 may input the state into a machine learned model in order to determine a planned send volume for the IP address for the current day. As such, the analytics application server 215 may automatically update planned send volumes for an IP warming plan based on the current state of the IP address, feedback information, or both.

Figure 3:
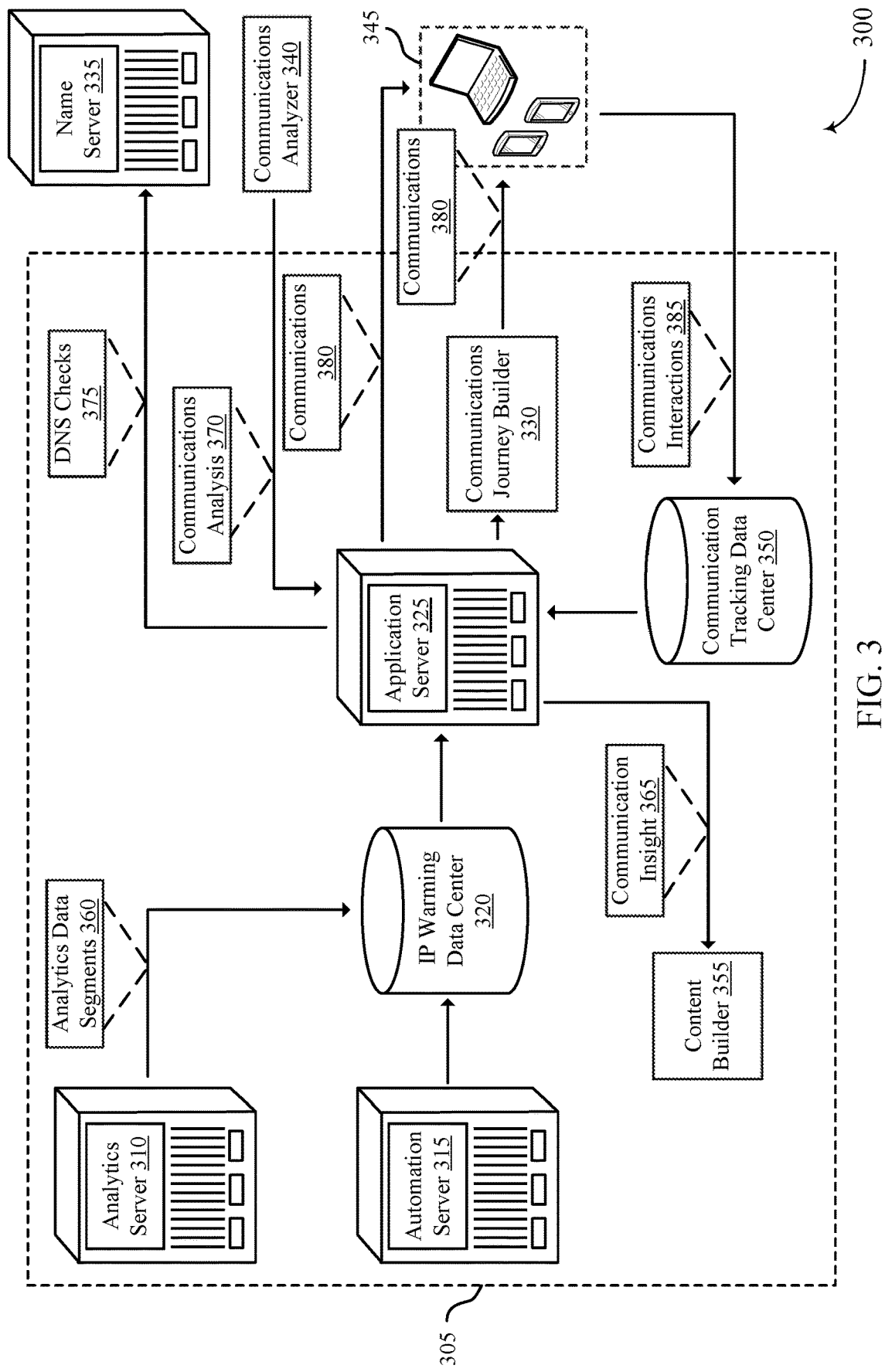
FIG. 3 illustrates an example of a database system that supports automated IP warming in accordance with aspects of the present disclosure.

FIG. 3 illustrates an example of a database system 300 that supports automated IP warming in accordance with aspects of the present disclosure. The database system 300, which may be an example of a data analysis system, includes a cloud component 305 including an analytics server 310, an automation server 315, an IP warming data center 320, an application server 325, a communication tracking data center 350, and a content builder 355. The database system 300 may also include non-cloud components such as a name server 335, a communications analyzer 340, and a set of user devices 345. The database system 300 may implement aspects of the systems 100 or 200 as described with reference to FIGS. 1 and 2. Additionally, the database system 300 may include additional or alternative cloud-based components, non-cloud components, or both.

The analytics server 310, the automation server 315, the application server 325, and the name server 335 may be examples or components of a cloud client 105 or an analytics application server 215. Further, the IP warming data center 320 and the communication tracking data center 350 may be examples or components of a data center 120 or a data store 210. Accordingly, any combination of the components of the database system 300 may implement aspects of the subsystem 125 or the system 200 as described with references to FIGS. 1 and 2.

In some cases, the analytics server 310 may transmit analytics data segments 360 to the IP warming data center 320. The analytics server 310 may segment, create, and update datasets of target recipients (e.g., analytics data segments 360 including segments of communication message recipients) that are to be used as part of the IP warming process. The analytics server 310 may transmit the analytics data segments 360 to the IP warming data center 320. For example, the analytics server 310 may analyze engagement scoring and engagement frequency for one or more users of a target population to determine one or more segments of users (e.g., segments of user devices), where a first segment of the users may include users that are statistically likely to open communication messages sent to the users. The IP warming data center 320 may store these segments of users (e.g., the analytics data segments 360) for use in improved IP warming. In some cases, the automation server 315 is in communication with the IP warming data center 320 and may also segment, create, and update groups of users that are to be used as part of the IP warming process. In some cases, the IP warming data center 320 may store the groups of users (e.g., one or more datasets specifying segments of target recipients) received from the analytics server 310 and the automation server 315.

In some cases, the application server 325 may receive the stored segments of target recipients from the IP warming data center 320. In some cases, the application server 325 may map the segments of target recipients to specific email campaigns or journeys. The application server 325 may configure an IP warming plan. In some examples, the IP warming plan may include a goal (e.g., a target number of communication messages to send), a date (e.g., a date by which a user wants to send the target number of communication messages), daily domain splits, a determination to front-load highly engaged subscribers (e.g., users corresponding to particular user segments in the IP warming data center 320), or any combination thereof. Additionally, in some cases, the application server 325 may configure alerts for the database system 300. Such alerts may include alerts related to high spam levels or high unsubscribe rates among recipients. In some cases, the application server 325 may configure communication message thresholds (e.g., as part of an IP warming plan).

In some cases, the application server 325 may trigger communication message transmissions (e.g., email sends) and journeys according to the IP warming plan. In some other cases, the application server 325 may recommend communication message transmission schedules, and a user may trigger the communication message transmissions (e.g., by accepting a recommended schedule, modifying a recommended schedule, etc.). In some examples, the application server 325 may analyze reports on a performance of the IP warming plan as compared to the projected performance of the IP warming plan. In some cases, the application server 325 may review a reputation of the IP address associated with the IP warming plan and may analyze a daily volume and types of communication messages being transmitted by the IP address. In some examples, the application server 325 may receive feedback from one or more sources and may revise the IP warming plan based on the feedback. In some such examples, the application server 325 may utilize predetermined rules or machine learning to revise the IP warming plan based on the received feedback.

In some cases, the application server 325 may communicate with the name server 335 to perform domain name system (DNS) checks 375. The DNS checks 375 may be accomplished through cooperation with the name server 335 in order to verify the presence of domain-based message authentication, reporting, and conformance (DMARC), domain keys identified mail (DKIM), or sender policy framework (SPF) records on the name server 335. The DNS checks 375 may allow the application server 325 to determine a relevant IP address (e.g., corresponding to the sender of the communication messages for an IP warming plan).

The application server 325 may receive communications analysis 370 from the communications analyzer 340. In some cases, the communications analysis 370 may provide inbox placement data and IP reputation score data to the application server 325. This communications analysis 370 may provide historical information for a target population and/or may provide feedback information based on how a set of recipients interacts with communication messages transmitted according to the IP warming plan. For example, the communications analyzer 340 may utilize an inbox placement tool, such as Return Path, to determine whether communication messages end up in spam folders at the receiving user devices. The application server 325 may use this communications analysis 370 to modify an IP warming plan, modify the communication messages (e.g., to avoid potential spamtraps), or both.

The application server 325—or a user device implementing a deliverability application running on the application server 325 or locally at the user device—may transmit communications 380, in the form of communication messages such as emails, text messages, advertisements, or the like, to a set of user devices 345. In some cases, the communications 380 may be transmitted directly from the application server 325 to the set of user devices 345. In some other cases, the communications 380 may be transmitted to the set of user devices 345 via a communications journey builder 330. In such cases, the communications journey builder 330 may determine a set of communication messages to transmit to a user device of the set of user devices 345 based on a "journey." For example, the "journey" may involve particular information to include in each communication message, an order of the communication messages, an amount of time between each communication message, or some combination thereof. Creating a "journey" for a recipient may increase the likelihood that the recipient responds in a particular way (e.g., opens a communication message, responds to a communication message, purchases a product, etc.) to the set of communication messages. The communications journey builder 330 may generate data related to the transmission of the communications 380 for use by components of the database system 300 as part of the IP warming plan. The communications journey builder 330 may additionally or alternatively modify one or more journeys based on feedback information (e.g., from the set of user devices 345, the communications analyzer 340, or both).

In some cases, following receipt of the communications 380 by the set of user devices 345, communications interactions 385 may be received by the communication tracking data center 350. The communications interactions 385 may include data related to the interactions of the users operating the set of user devices 345 with the received communications 380. For example, the communications interactions 385 may include an opening of a communication message by a user device, clicks within a communication message, bouncing of a communication message, a message sent in response to a communication message, or any combination of these or other interactions with the communications 380. In some cases, the communications interactions 385 may include data related to any interaction with the communications 380 by a user at any user device of the set of user devices 345. The communications interactions 385 may be stored by the communication tracking data center 350 for transmission to the application server 325, which may use the communications interactions 385 to further update or revise the IP warming plan. In some cases, the communication tracking data center 350 may analyze the communications interactions 385 and may store information related to the analysis.

In some cases, the application server 325 may transmit a communication insight 365 to a content builder 355. The communication insight 365 may include data related to the communications 380 and the resulting interactions with the communications at one or more of the set of user devices 345. For example, the communication insight 365 may include insights or recommendations related to improving the success of user interactions yielded by the communications 380 (e.g., by improving email content). In some cases, the content builder 355 may store the communication insight 365 for use as part of future IP warming plans. Additionally or alternatively, the content builder 355 may generate communication message content (e.g., updated subject lines, bodies, recipients, etc.) based on the communication insight 365. A user may interact with the content builder 355 to generate one or more communication messages for transmission. In some cases, the content builder 355 may provide insights or analysis in real time as a user creates a communication message (e.g., predicting a likelihood that a user will open the message, respond to the message, etc. based on the current content of the communication message).

In some implementations, any of the devices or processes described herein may operate on ISP-specific data segments. For example, the analytics data segments 360 may be separated according to different ISPs. In some cases, the application server 325 may transmit communications 380, receive communications analysis 370, or both on an ISP-by-ISP basis, such that the application server 325 may determine how different ISPs handle the sending IP address and may manage the IP warming accordingly. For example, if one ISP blocks communications 380 from the application server 325, the application server 325 may throttle communications 380 sent to that ISP (e.g., without throttling communications 380 sent to other ISPs). Additionally or alternatively, the application server 325 may automatically utilize global IP warming changes (e.g., throttling across all ISPs based on one or more feedback metrics).

Figure 4:
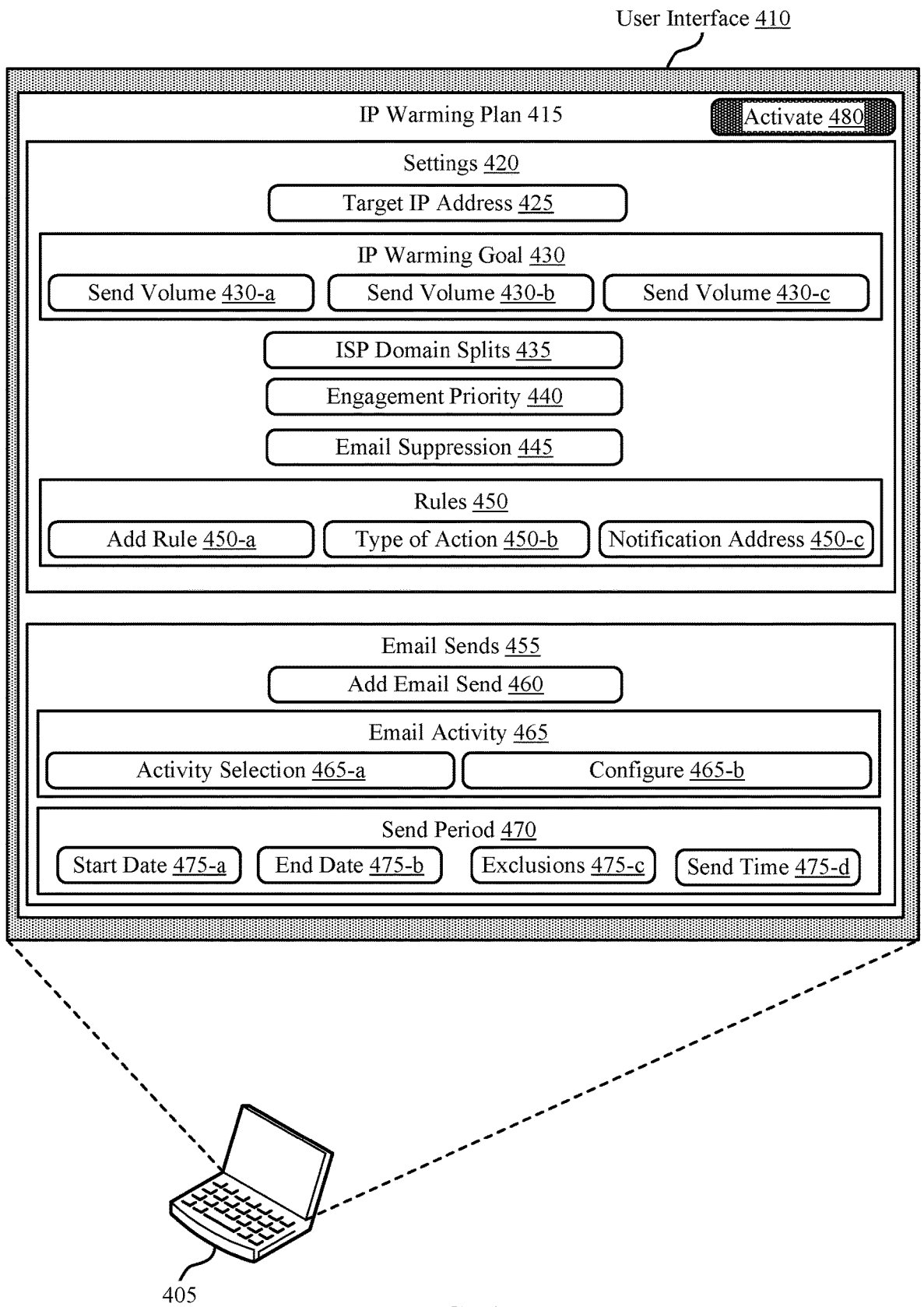
FIG. 4 illustrates an example of a user device including a user interface that supports automated IP warming in accordance with aspects of the present disclosure.

FIG. 4 illustrates an example of a user device 405 including a user interface 410 that supports automated IP warming in accordance with aspects of the present disclosure. In some cases, the user interface 410 may provide a single view that represents a current state of an automated IP warming plan. The user interface 410 may display user selections and factors associated with an automated IP warming plan. In some cases, the user interface 410 may additionally display data associated with the user selections and factors as well as data associated with other data objects corresponding to the automated IP warming plan. As illustrated, the user interface 410 may include an IP warming plan 415 including settings 420 and email sends 455. However, it is to be understood that the user interface 410 represents an example user interface, and other user interface configurations are supported by the techniques and processes described herein.

The user interface 410 may support automated IP warming as described with reference to FIGS. 1 through 3. In some cases, a user may view and interact with the user interface 410 to create, update, or understand an IP warming plan and various aspects of the IP warming plan. For example, the user may use the user interface 410 to visualize and determine options and criteria for an IP warming plan. In some examples, a user may use the user interface 410 to understand a current state of an IP warming plan. For example, the user interface 410 may display data related to a send volume of the IP warming plan or a date range of the IP warming plan.

The settings 420 portion of the IP warming plan 415 may include a set of options relevant to creation, review, and maintenance of an IP warming plan. In some cases, the settings 420 may include a target IP address 425, an IP warming goal 430, ISP domain splits 435, an engagement priority 440, email suppression 445, and rules 450. In some cases, the settings 420 may include any combination of the above referenced options. For example, the ISP domain splits 435 may include domain split percentages between different ISPs based on a user's existing subscriber base. This information may be input by the user or mined from the user's engagement history or a target population (e.g., the intended recipients for the IP warming goal 430).

In some cases, the IP warming goal 430 of the user interface 410 may include a send volume 430-a, a send volume 430-b, and a send volume 430-c. In such cases, each of the send volumes may be related to specific and distinct communication transmissions to one or more devices associated with one or more desired recipients. Alternatively, the different send volume goals may correspond to different timelines (e.g., a time by which the user wants to be able to send the indicated send volume without having deliverability issues). In some cases, the rules 450 of the IP warming plan 415 may include several additional options including add rule 450-a, types of action 450-b, and notification address 450-c. A rule 450 may include a condition, such as a blocked domain, a high complaint rate (e.g., above some threshold), a low engagement rate (e.g., below some threshold), a high bounce rate, a daily send volume exceeding a recommended send volume, or any other relevant condition.

The email sends 455 portion of the user interface 410 may include an add email send 460, an email activity 465, and a send period 470. In some cases, the email activity 465 may include an activity selection 465-a and a configure option 465-b. In some cases, the send period 470 may include a start date 475-a, an end date 475-b, exclusions 475-c, and a send time 475-d. A user may configure email activities to be used for IP warming. For example, the user may set a date range for the send period 470, a preferred send time 475-d (e.g., 10:00 a.m.) for the emails, or both. The user may additionally or alternatively add segments of users to the target audience for the IP warming goal 430 to create a pool of subscribers.

The user interface 410 may support creation, management, and revisions of multiple IP warming plans. In some examples, the user interface 410 may display information that a user has permission to view and may hide (or otherwise not display) additional information. For example, the user interface 410 may display information related to IP warming plans but may not display addresses of specific recipients based on a permission level associated with a user that is viewing the user interface. The database system may automatically filter the information that may be viewed in each user interface 410 according to the role of the user viewing the user interface 410. Additionally or alternatively, the database system may support customizable user interfaces 410 for use by the users.

One or more of the fields in the user interface 410 may be automatically generated (e.g., in an automated IP warming process), while other fields may be specified by a user. For example, a user may input the IP warming goal 430 (e.g., a send volume 430-a). The other fields may be automatically populated based on the IP warming goal 430 or may additionally be input by the user. The user may modify one or more of the fields in the user interface 410, and a corresponding IP warming plan may update in real time based on the user inputs. The user may select to activate 480 the IP warming plan 415, and the user device 405—or a deliverability application running at the user device 405 or at a backend server—may generate a transmission schedule to meet the goal(s) of the IP warming plan 415. In some cases, the user interface 410 may display the resulting transmission schedule to the user.

In a specific example, a user may input the IP warming goal 430 and rules 450 for a target IP address 425 into the user interface 410. An automated IP warming application may automatically create an IP warming plan based on the user input information. For example, the automated IP warming application may schedule daily email sends according to the IP warming plan. In some cases, the automated IP warming application may suppress common email mistakes and invalid emails, use rules and/or machine learning to automatically create the IP warming plan, provide deliverability reports and/or dashboards for a user, provide notifications and/or alerts to the user, provide insights for improved deliverability, or support any combination of these features. The automated IP warming application may integrate with other applications or tools, such as machine learning tools, analytics systems, inbox placement tools, or the like. In some cases, the automated IP warming application may include a deliverability checklist to ensure compliance with one or more regulations (e.g., controlling the assault of non-solicited pornography and marketing (CAN-SPAM) compliance) prior to sending emails.

Figure 5:
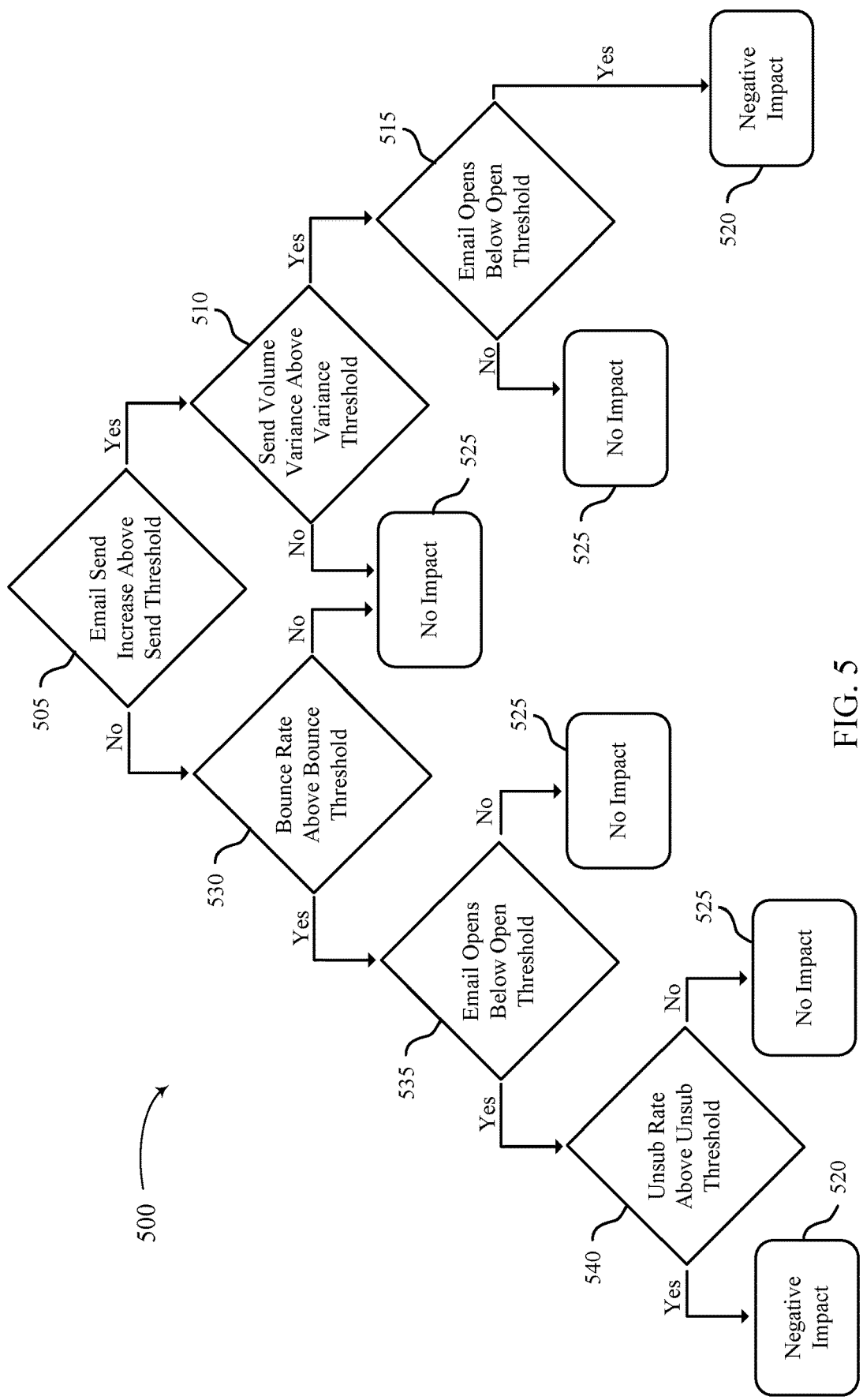
FIG. 5 illustrates an example of a process decision tree that supports automated IP warming in accordance with aspects of the present disclosure.

FIG. 5 illustrates an example of a process decision tree 500 that supports automated IP warming in accordance with aspects of the present disclosure. In some cases, the process decision tree 500 may represent one or more events related to an automated IP warming plan. The process decision tree 500 may be implemented by components of systems 100 or 200 or database system 300 as described herein with reference to FIGS. 1 through 3. For example, the process decision tree 500 may include multiple steps and triggers associated with at least a portion of an IP warming plan and may be used by the servers associated with any of the systems described herein with reference to FIGS. 1 through 3. However, it is to be understood that the process decision tree 500 for an IP warming plan may involve any combination of the described steps and triggers or any additional or alternative steps or triggers that may facilitate implementation and operation of the IP warming plan.

A system supporting an automated deliverability application may implement artificial intelligence machine reinforcement learning to predict when a send volume increase for an IP address is likely to impact the sender reputation for the IP address (e.g., for one or more ISPs). The system may use such a prediction to avoid potential issues before the issues arise based on a planned send volume increase. For example, the system may send an alert or notification to a user indicating the predicted negative effect on the sender's reputation, or the system may automatically throttle sending communication messages (e.g., emails) to avoid the negative effect on the sender's reputation. In some cases, the system may implement one or more random forest models (e.g., with multiple decision trees) to predict whether an increase in ISP send volumes for an IP address is likely to negatively impact the sender reputation score for the IP address. The system may run one or more datasets through one or more machine learning models (e.g., random and/or different models in a "forest of trees" machine learning approach) to determine the likely outcome of a send volume increase. In some cases, these models may be generated based on historical information (e.g., using supervised learning, unsupervised learning, or a combination of both). The datasets may include an ISP feedback loop (e.g., including inbox placement data, spam data, blocking data, etc.), email send volumes, subscriber engagement history, or some combination of this or other relevant data. In some cases, the system may implement a number of ISP-specific machine learned models to determine ISP-specific changes to an IP warming plan. Additionally or alternatively, the system may implement a global machine learned model to determine global changes to the IP warming plan. The machine learned models described herein may be examples of any types of machine learned models.

An example dataset is presented in Table 1. In some cases, the dataset may include multiple values for a parameter corresponding to different time durations. For example, the dataset may include a proposed send volume increase for the next day, the next seven days, the next month, or any combination of these or other specified time durations. Similarly, the dataset may include an unsubscribe rate for the last one day, the last seven days, or both.

TABLE 1

Example Dataset

| Proposed Send Volume Increase | Previous Send Volume | Unsubscribe Rate | Send Volume Variance | Spam Rate | Bounce Rate | Email Open Rate |
|---|---|---|---|---|---|---|
| 200.0% | 500,000 | 5.0% | 20.0% | 0.0% | 2.0% | 25.0% |
| 175.0% | 400,000 | 2.5% | 10.0% | 0.0% | 2.5% | 30.0% |
| 250.0% | 200,000 | 3.0% | 30.0% | 2.0% | 5.0% | 15.0% |

The system may run the same dataset through one or more models and—based on the average probabilistic outcome of the models—may determine whether a particular increase in an email send volume for an IP address is likely to impact the sender reputation score for the IP address. Each step (e.g., "leaf") in the process decision tree 500 may correspond to a probability based on artificial intelligence machine reinforcement learning of how the model performs (e.g., based on the ISP feedback loop). For example, the system may calculate thresholds for each step based on artificial intelligence machine reinforcement learning. If the model determines that there will be "no impact" based on a proposed send volume increase, the system may allow a user to perform the send volume increase for the IP address. However, if the model determines that there will be a "negative impact" based on the proposed send volume increase, the system may block the user from performing the send volume increase, throttle email sends for the IP address, display an alert to the user, or perform some combination of these actions to mitigate the negative impact to the sending reputation of the IP address. In some cases, the system may analyze a confidence metric for the model to determine how to handle a send volume increase. For example, the system may ignore a prediction from a model (e.g., a prediction of a "negative impact") if the prediction corresponds to a relatively poor model confidence metric (e.g., below some threshold confidence metric).

At 505, the system may evaluate a proposed email send volume increase. For example, if the proposed email send volume increases equal to or greater than a send volume threshold (e.g., 200%), the process decision tree 500 moves to 510. If the proposed email send volume increase is less than the send volume threshold, the process decision tree 500 moves to 530.

At 510, the system may evaluate a send volume variance. For example, if the send volume variance is not above a variance threshold (e.g., 20%) it is determined that there is likely to be no resulting impact on the sender's reputation score (e.g., for one or more ISPs) at 525. If the send volume variance is greater than the variance threshold, the process decision tree 500 moves to 515.

At 515, the system may evaluate user interaction information. For example, the system may evaluate a percentage of email opens performed by recipients over a previous time duration (e.g., one day). If the email opens are not below an open threshold (e.g., 20%), the system may determine that there is likely to be no impact to the sender's reputation score at 525. If the email opens are below the open threshold, it is determined that there is likely to be a negative impact on the sender's reputation score (e.g., for one or more ISPs) at 520.

At 530, the system may evaluate a bounce rate for emails. For example, if the bounce rate is not above a bounce rate threshold (e.g., 5%), the system may determine that there is likely to be no impact to the sender's reputation score at 525. If the bounce rate is above the bounce rate threshold, the process decision tree 500 moves to 535.

At 535, the system may evaluate user interaction information. For example, the system may evaluate a percentage of email opens performed by recipients over a previous time duration (e.g., seven days). If the email opens are not below an open threshold (e.g., 15%), the system may determine that there is likely to be no impact to the sender's reputation score at 525. If the email opens are below the open threshold, the process decision tree 500 moves to 540. The open thresholds and time durations at 515 and 535 may be the same or different (e.g., based on the machine learned model).

At 540, the system may evaluate an unsubscribe rate for the recipients of the emails. For example, if the unsubscribe rate is not above an unsubscribe threshold (e.g., 5%), the system may determine that there is likely to be no impact to the sender's reputation score at 525. If the unsubscribe rate is above the unsubscribe threshold, the system may determine that there is likely to be a negative impact on the sender's reputation score (e.g., for one or more ISPs) at 520. Based on the results of the process decision tree 500, one or more of the above-described systems may make changes to an IP warming plan or solicit input from a user regarding potential changes to the IP warming plan. Additionally or alternatively, a system may implement other machine learning techniques to determine whether a proposed send volume increase is likely to have a negative impact on a sender reputation score for an IP address.

Figure 6:
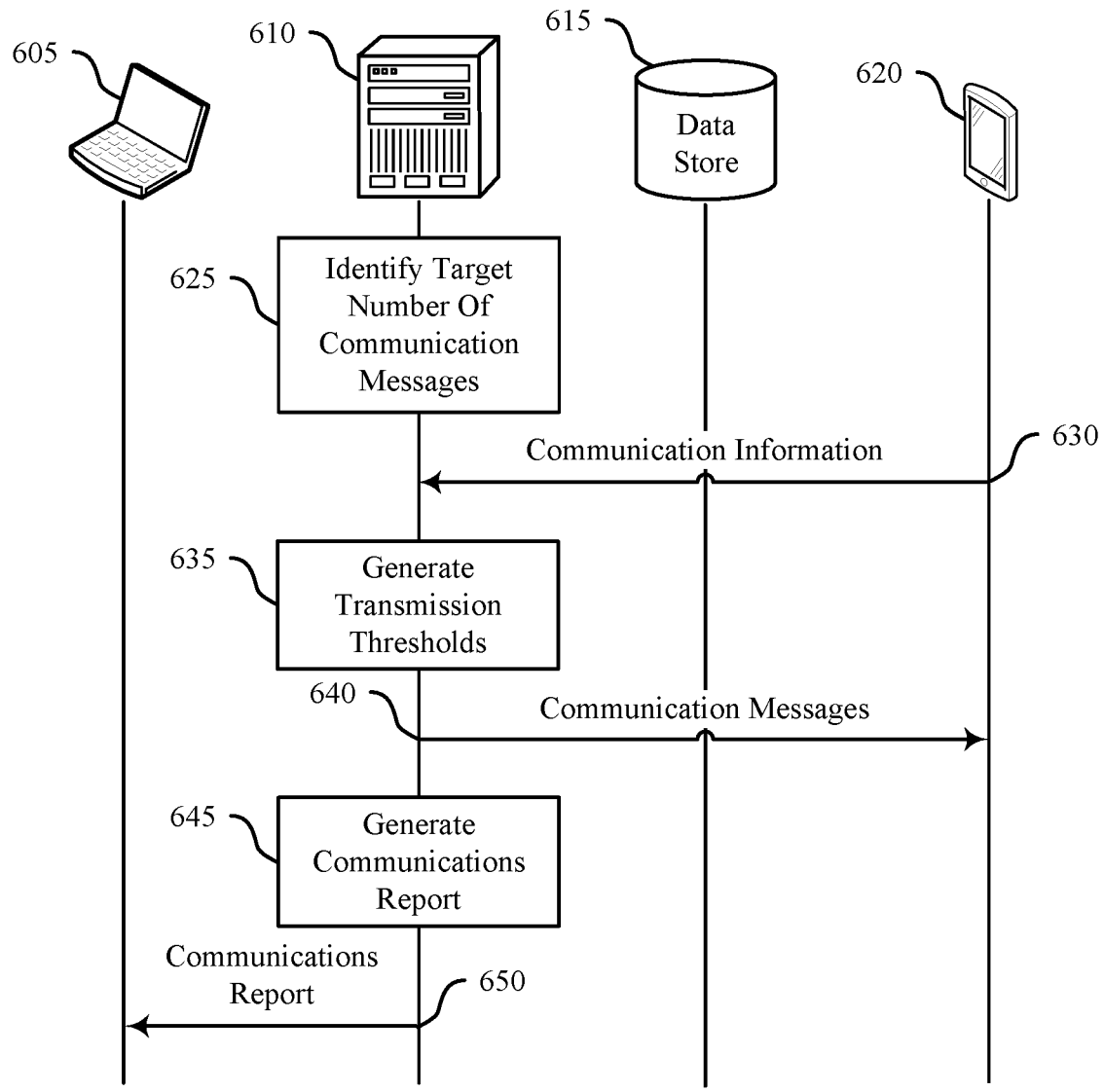
FIG. 6 illustrates an example of a process flow that supports automated IP warming in accordance with aspects of the present disclosure.

FIG. 6 illustrates an example of a process flow 600 that supports automated IP warming in accordance with aspects of the present disclosure. The process flow 600 includes a user device 605, an analytics application server 610, a data store 615, and a target recipient 620 (e.g., one or more users or user devices). These may be examples of the corresponding devices described with reference to FIGS. 1 through 5. Alternative examples of the following may be implemented, where some steps are performed in a different order than described or are not performed at all. In some cases, steps may include additional features not mentioned below, or further steps may be added.

At 625, the analytics application server 610 may identify a target number of communication messages to transmit from an IP address to a set of devices. For example, the set of devices may include one or more target recipients 620. In some cases, the communication messages may include emails, text messages, or any other type of electronic communication. In some cases, the target recipients 620 may be user devices including any type of user device through which a user may interact with or receive communication messages. The analytics application server 610 may recommend an IP warming plan—or recommend changes to an existing IP warming plan—to achieve a send volume goal (e.g., a target number of communication messages to transmit).

In a first example, a user may input a send volume goal of one million emails per day. However, the user may not currently send enough email messages from the IP address to support sending one million emails in a day without triggering an ISP to block the emails from this IP address. Accordingly, the user may use an IP warming plan to gradually build the send volume of the IP address to eventually support the send volume goal of one million emails per day. In a second example, a user may input an IP warming plan or target send volume. However, the emails that will be sent according to a user-generated IP warming plan may not be reflective of the user's subscriber base, ISP domain splits, or both. Such an IP warming plan may risk damaging the user's sender reputation for one or more ISPs. The analytics application server 610 may automatically take into account the user's subscriber base, ISP domain splits, or both when generate an IP warming plan to mitigate the negative impact of building a user's send volume for a particular IP address.

At 630, the analytics application server 610 may retrieve communication information for the target recipients 620. In some cases, the communication information may indicate how the target recipients 620 interact with communication messages. In some cases, the analytics application server 610 may also validate email addresses for a set of devices (e.g., corresponding to the target recipients 620) prior to generating or transmitting the communication messages.

In some cases, the analytics application server 610 may determine a communication history for the target recipients 620 based on the communication information. The determined communication history may indicate how a target recipient 620 interacts with communication messages. In some cases, the determined communication history may indicate whether previous communication messages received by a target recipient 620 were read, unread, saved, deleted, sent to a spam folder, blocked, replied to, forwarded, or a combination thereof, for example.

In some cases, the analytics application server 610 may determine a subject, a communication message content, a set of keywords, or a combination thereof for each of the communication messages based on the communication information for the target recipients 620.

At 635, the analytics application server 610 may generate transmission thresholds for the IP address. In some cases, the analytics application server 610 may generate a set of transmission thresholds corresponding to a set of time durations for transmitting communication messages based on the target number of communications messages and the communication information. This set of transmission thresholds corresponding to the set of time durations may be an example of a transmission schedule (e.g., for an IP warming plan). For example, the transmission thresholds may indicate a number of emails that the IP address may send each day (e.g., where each day corresponds to a time duration of the set of time durations).

In some cases, the analytics application server 610 may identify a corresponding ISP for each target recipient 620. In some cases, the set of transmission thresholds, the set of time durations, or a combination thereof may be based on the corresponding ISP for each target recipient 620. For example, the transmission schedule may indicate a number of emails that the IP address may send to each ISP of a set of relevant ISPs each day. In some cases, the set of ISPs may include individual ISPs, groups of ISPs, or a combination thereof. Each ISP may have a unique set of spam triggers that determine whether communication messages are sent to the spam folder or inbox for a target recipient 620. The analytics application server 610 may implement machine learning techniques to determine the metrics that each ISP uses for deliverability or sender reputation determination. These metrics may be used globally (e.g., across IP addresses, users, organizations, tenants, multiple tenants, etc.) to help build efficient, effective IP warming plans.

In some examples, the analytics application server 610 may determine priority values for the target recipients 620 based on the communication information for the target recipients 620. In some cases, the set of transmission thresholds may be based on the priority values for the target recipients 620. For example, the analytics application server 610 may send a higher volume of emails to target recipients 620 with a high priority (e.g., recipients that are likely to open the emails, such as existing subscribers) than target recipients 620 with a lower priority. Additionally or alternatively, the analytics application server 610 may use existing subscriber email send tracking data to find additional email audiences by identifying under-saturated subscribers (e.g., subscribers not receiving a threshold amount of emails despite parameters indicating that the subscribers may be active recipients of emails). The analytics application server 610 may increase an email send volume using the identified additional email audiences.

In some cases, the analytics application server 610 may receive a modification to the transmission thresholds from a user. For example, the user may communicate the modification to the transmission thresholds to the analytics application server 610 via the user device 605. The analytics application server 610 may transmit the communication messages based on the modification.

In some cases, the analytics application server 610 may generate the communication messages based on the communication information for the target recipients 620. The set of communication messages may be generated by the analytics application server 610 based on a communication message template for IP warming. The analytics application server 610 may perform NLP functions to determine content for the communication messages (e.g., to increase the likelihood that a target recipient 620 opens a communication message). In some other cases, a user operating user device 605 may create the communication messages (e.g., independently or with the aid of insights from the analytics application server 610).

At 640, the analytics application server 610 may transmit the set of communication messages to the target recipients 620 based on the set of transmission thresholds. In some cases, the analytics application server 610 may transmit, during a first time duration, a first set of communication messages to a first subset of the target recipients 620 that have a first priority value. The analytics application server 610 may then transmit, during a second time duration, a second set of communication messages to a second subset of the target recipients 620 that have a second priority value that is lower than the first priority value.

In some cases, the analytics application server 610 may determine updated communication information for the target recipients 620 based on how the target recipients 620 interact with the set of communication messages. In some examples, the analytics application server 610 may determine adjusted transmission thresholds based on the updated communication information determined for the target recipients 620.

In some cases, the analytics application server 610 may select a timing for transmitting the communication messages. In some examples, the timing for transmitting the communication messages may be based on a likelihood of the communication messages being opened at the selected timing. For example, the selected send timing may be based on a time of day at which a user often opens emails. Additionally or alternatively, the selected send timing may account for a send frequency. For example, the analytics application server 610 may use machine learning to determine an optimal send frequency for each target recipient 620 (or for a set of target recipients 620) and may send emails according to the determined send frequency (e.g., to reduce the risk of target recipients 620 unsubscribing from the email list).

In some cases, the analytics application server 610 may determine, for a first time duration for transmitting communication messages (e.g., a first day), a first transmission threshold for transmitting a first subset of communication messages. In some cases, transmitting the communication messages includes transmitting the first subset of the communication messages during the first time duration. In some examples, the analytics application server 610 may determine additional communication information for the first subset of communication messages based on transmitting the first subset of communication messages (e.g., via an ISP feedback loop). The analytics application server 610 may determine, for a second time duration (e.g., a second day) subsequent to the first time duration, a second transmission threshold for transmitting a second subset of communication messages based on the additional communication information for the first subset of communication messages. For example, the IP warming plan may automatically update based on feedback information for transmitted communication messages.

In some cases, the analytics application server 610 may track a reputation score for an IP address associated with the user device 605. In some cases, the transmission thresholds, the time durations, or a combination thereof may be based on the reputation score for the IP address associated with the user device 605. For example, if the analytics application server 610 determines that the reputation score for the IP address is decreasing (or is likely to decrease), the analytics application server 610 may throttle a send volume of emails and adjust the IP warming plan (e.g., the transmission schedule) to stop one or more ISPs from blacklisting the IP address based on a poor reputation score.

At 645, the analytics application server 610 may generate a communications report for the set of communications messages. In some cases, the communications report for the set of communications messages may be based on how the target recipients 620 interacted with the set of communications messages.

At 650, the analytics application server 610 may send the communications report to the user device 605 for display in a user interface of the user device 605. In some examples, the analytics application server 610 may notify a user associated with the IP address of various factors or variables. For example, the user may be notified if the communication messages have exceeded a send volume limit, if one or more of the target recipients 620 have unsubscribed or filed a communication message as spam, if a message opening rate has dropped, or if any combination of these triggers occurs. The user may update a communication message transmission plan based on viewing the communications report.

The process flow 600 may support a number of different use cases. In a first example, the process flow 600 may support IP warming for a new user with a new IP address. The new user with the new IP address may use a deliverability application implementing the process flow 600 to automate the IP warming plan generation, execution, monitoring, and remediation. The deliverability application may check that standard email authentication has been set up and may automate the create of an IP warming plan. The user may modify and/or fine tune the IP warming plan based on recommendations from the deliverability application. The deliverability application may additionally automate the creation of segments of users (e.g., target recipients) to be used for sending emails (e.g., with domain splits, daily send volumes, email engagement, etc.). In some cases, the deliverability application may automate an email send schedule according to the IP warming plan. The deliverability application may implement a send time optimization (STO) tool to increase the likelihood of recipient engagement, and the deliverability application may suppress or remove any invalid email addresses.

In some specific examples, the deliverability application may prompt the user to sign up to smart network data services (SNDS) and/or Postmaster to track the sender reputation for the new IP address. Additionally or alternatively, the deliverability application may enable a custom seed list for manual deliverability checks. The deliverability application may create emails using pre-built IP warming email templates and may provide analytic recommendations (e.g., in a content builder application) to improve deliverability. Recommendations may include, for example, including fewer images, adding more text, removing particular trigger words, improving the subject line, adding a call to action, or the like to improve the content of a communication message. The deliverability application—or another analytics application integrated with the deliverability application—may determine the recommendations based on NLP analysis of historical communication messages and recipient engagement. In some cases, the deliverability application may use machine learning to predict IP warming issues. The deliverability application may support a user interface in which the user may set up rules and/or conditions, where the IP warming plan is automatically tailored based on the user input rules, conditions, or both. The deliverability application may support displaying notifications, alerts, reports, or some combination thereof in the user interface. These notifications, alerts, and reports may include alerting the user to significant drops in an open rate, unsub scribe alerts, spam complaint alerts, alerts if a send volume limit is exceeded, reports indicating email performance by domain (e.g., by ISP), or the like.

In a second example, the process flow 600 may support IP warming for an existing user adding a new IP address. The deliverability application implementing the process flow 600 may automate IP warming for the additional IP address for the existing user. The deliverability application may deliver and execute an IP warming plan for the additional IP address. Furthermore, the deliverability application may find additional audiences that can be targeted using an engagement frequency analysis application (e.g., by adding under-engaged subscribers to an IP warming recipient pool). The deliverability application may front-load highly engaged subscribers as recipients in the IP warming plan based on existing subscriber engagement data. Additionally or alternatively, the deliverability application may display IP address-specific notifications, alerts, and reports to the user (e.g., such that the user may differentiate information between the multiple IP addresses associated with the same user).

In a third example, the process flow 600 may support IP warming for an existing user preparing for a large volume, ad hoc email transmission. The deliverability application may account for the current IP address send volume limits to determine whether to implement additional IP warming to support the large volume, ad hoc email send (e.g., while avoiding damaging the user's sending reputation). The deliverability application may deliver and execute an IP warming plan to meet the large volume, ad hoc email send. Additionally or alternatively, the deliverability application may determine whether the user should add a new IP address to support the large volume, ad hoc email send.

Figure 7:
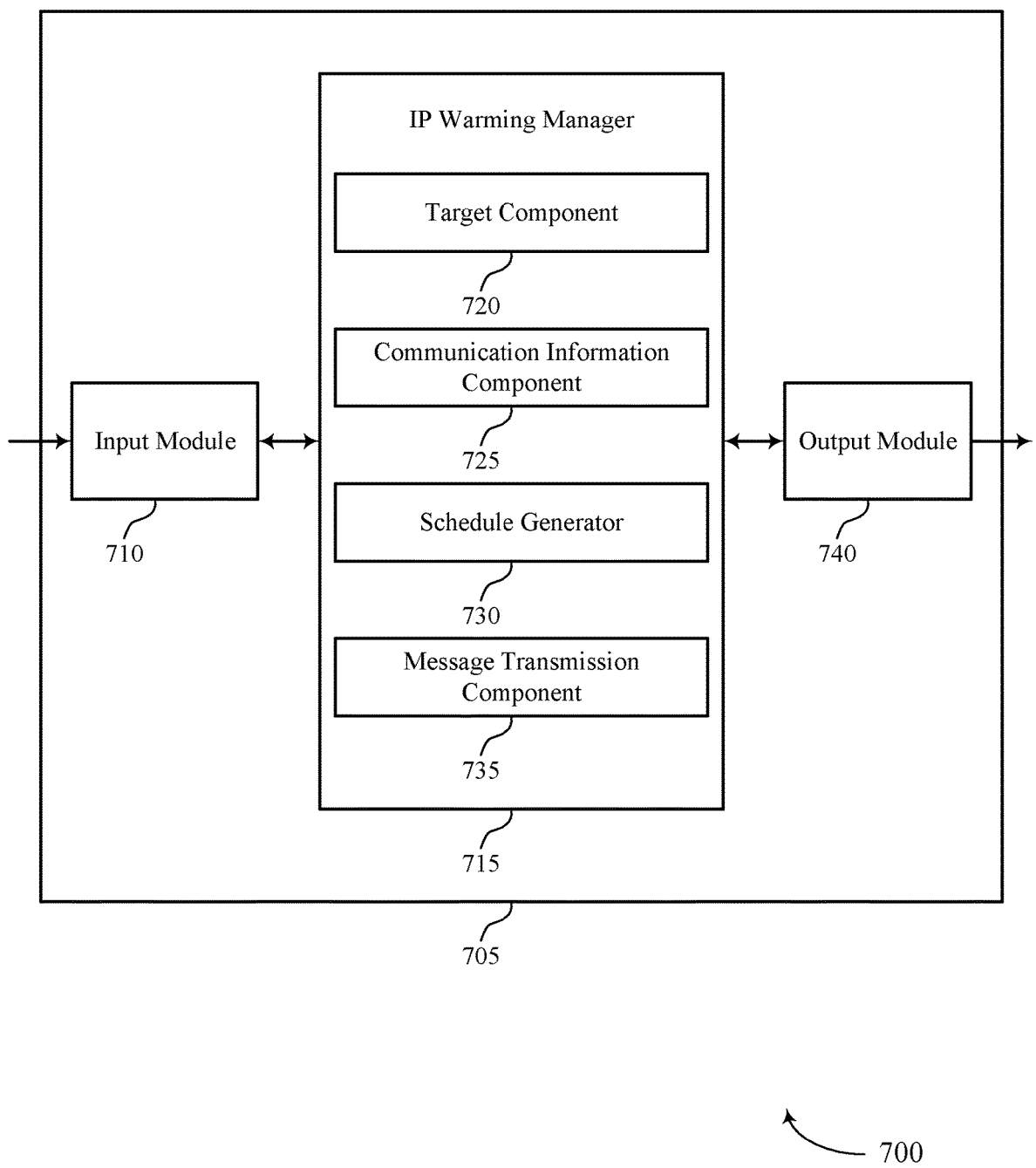
FIG. 7 shows a block diagram of an apparatus that supports automated IP warming in accordance with aspects of the present disclosure.

FIG. 7 shows a block diagram 700 of an apparatus 705 that supports automated IP warming in accordance with aspects of the present disclosure. The apparatus 705 may include an input module 710, an IP warming manager 715, and an output module 740. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the IP warming manager 715 to support IP warming. In some cases, the input module 710 may be a component of an input/output (I/O) controller 915 as described with reference to FIG. 9.

The IP warming manager 715 may include a target component 720, a communication information component 725, a schedule generator 730, and a message transmission component 735. The IP warming manager 715 may be an example of aspects of the IP warming manager 805 or 910 described with reference to FIGS. 8 and 9.

The IP warming manager 715 and/or at least some of its various sub-components may be implemented in hardware, software executed by a processor, firmware, or any combination thereof. If implemented in software executed by a processor, the functions of the IP warming manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The IP warming manager 715 and/or at least some of its various sub-components may be physically located at various positions, including being distributed such that portions of functions are implemented at different physical locations by one or more physical devices. In some examples, the IP warming manager 715 and/or at least some of its various sub-components may be a separate and distinct component in accordance with various aspects of the present disclosure. In other examples, the IP warming manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The target component 720 may identify a target number of communication messages to transmit from an IP address to a set of devices. The communication information component 725 may retrieve communication information for the set of devices, where the communication information indicates how the set of devices interacts with communication messages.

The schedule generator 730 may generate, for the IP address, a set of transmission thresholds corresponding to a set of time durations for transmitting communication messages based on the target number of communication messages and the communication information. The message transmission component 735 may transmit a set of communication messages to the set of devices based on the set of transmission thresholds.

The output module 740 may manage output signals for the apparatus 705. For example, the output module 740 may receive signals from other components of the apparatus 705, such as the IP warming manager 715, and may transmit these signals to other components or devices. In some specific examples, the output module 740 may transmit output signals for display in a user interface, for storage in a database or data store, for further processing at a server or server cluster, or for any other processes at any number of devices or systems. In some cases, the output module 740 may be a component of an I/O controller 915 as described with reference to FIG. 9.

Figure 8:
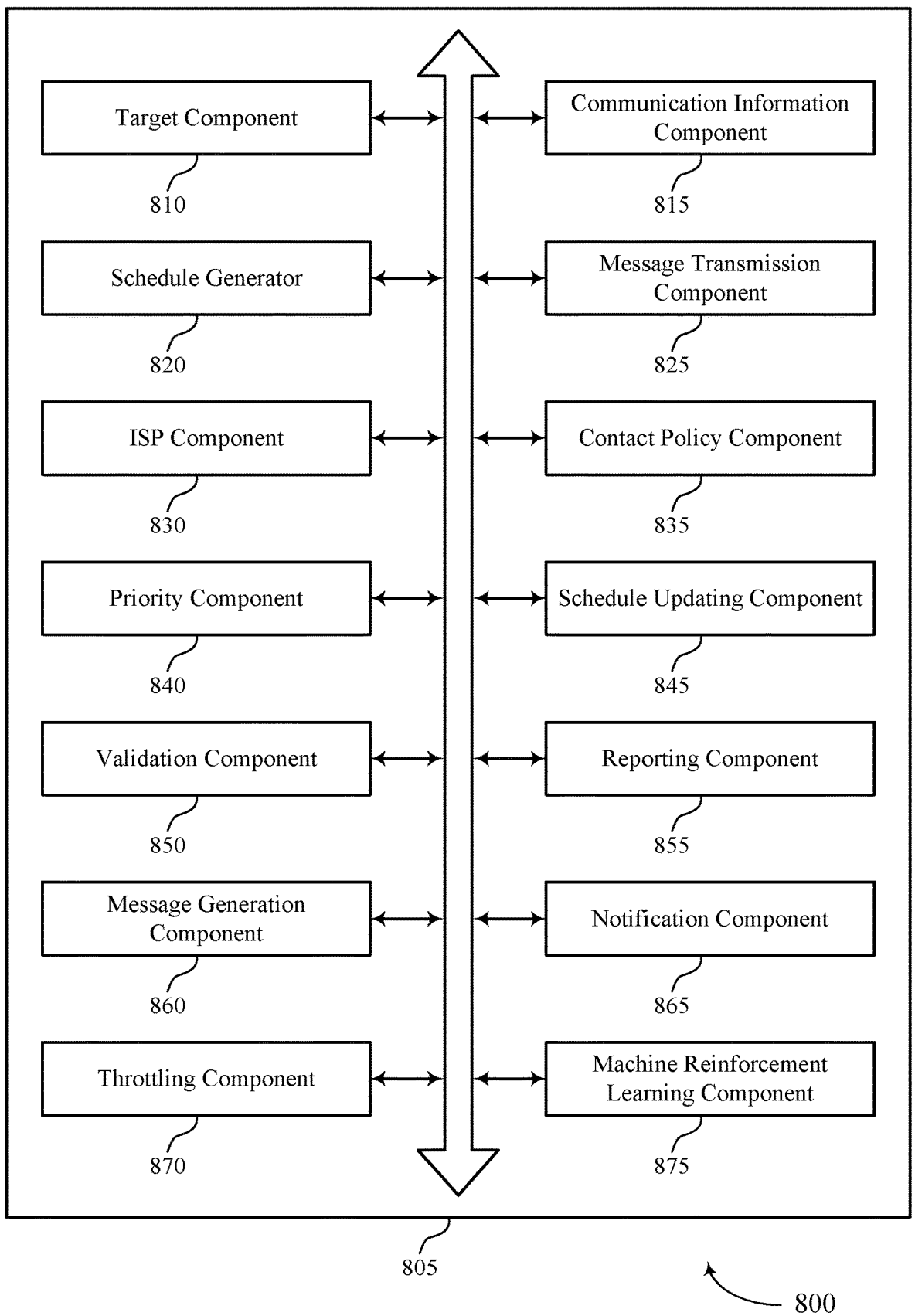
FIG. 8 shows a block diagram of an IP warming manager that supports automated IP warming in accordance with aspects of the present disclosure.

FIG. 8 shows a block diagram 800 of an IP warming manager 805 that supports automated IP warming in accordance with aspects of the present disclosure. The IP warming manager 805 may be an example of aspects of an IP warming manager 715 or an IP warming manager 910 described herein. The IP warming manager 805 may include a target component 810, a communication information component 815, a schedule generator 820, a message transmission component 825, an ISP component 830, a contact policy component 835, a priority component 840, a schedule updating component 845, a validation component 850, a reporting component 855, a message generation component 860, a notification component 865, a throttling component 870, a machine reinforcement learning component 875, or any combination of these components. Each of these components may communicate, directly or indirectly, with one another (e.g., via one or more buses).

The target component 810 may identify, by a computer processor, a target number of communication messages to transmit from an IP address to a set of devices. The communication information component 815 may retrieve, by the computer processor, communication information for the set of devices, where the communication information indicates how the set of devices interacts with communication messages. In some examples, the communication information component 815 may determine a communication history for the set of devices based on the communication information, where the communication history indicates how the set of devices interacts with communication messages based on whether previous communication messages were read, unread, saved, deleted, sent to a spam folder, blocked, replied to, forwarded, or a combination thereof.

The schedule generator 820 may generate, by the computer processor and for the IP address, a set of transmission thresholds corresponding to a set of time durations for transmitting communication messages based on the target number of communication messages and the communication information. The set of transmission thresholds corresponding to the set of time durations may be an example of a transmission schedule for IP warming. The message transmission component 825 may transmit, by the computer processor, a set of communication messages to the set of devices based on the set of transmission thresholds.

The ISP component 830 may identify a corresponding ISP for each device of the set of devices, where the set of transmission thresholds, the set of time durations, or a combination thereof is based on the corresponding ISP for each device.

In some examples, the communication information component 815 may track a reputation score for an IP address associated with a device of the set of devices, where the set of transmission thresholds, the set of time durations, or a combination thereof is based on the reputation score for the IP address.

The contact policy component 835 may identify one or more contact policies for transmitting communication messages, where the set of transmission thresholds, the set of time durations, or a combination thereof is based on the one or more contact policies for transmitting communication messages.

The priority component 840 may determine priority values for the set of devices based on the communication information for the set of devices, where the set of transmission thresholds is based on the priority values for the set of devices. In some examples, the priority component 840 may transmit, during a first time duration, a first set of communication messages of the set of communication messages to a first subset of devices of the set of devices with a first priority value and may transmit, during a second time duration subsequent to the first time duration, a second set of communication messages of the set of communication messages to a second subset of devices of the set of devices with a second priority value less than the first priority value.

The schedule updating component 845 may determine updated IP warming information, where the updated IP warming information includes updated communication information for the set of devices based on how the set of devices interacts with the set of communication messages, updated ISP tracking data, updated sender reputation data for the IP address, or a combination thereof. The schedule updating component 845 may determine a set of adjusted transmission thresholds based on the updated IP warming information. In some examples, the schedule updating component 845 may receive, at the computer processor and from a user, a modification to the set of transmission thresholds, where the set of communication messages is transmitted based on the modification.

The validation component 850 may validate email addresses for the set of devices prior to transmitting the set of communication messages to the set of devices.

The reporting component 855 may generate a communications report for the set of communication messages based on how the set of devices interact with the set of communication messages. The reporting component 855 may send the communications report for display on a user interface.

The message generation component 860 may generate the set of communication messages based on the communication information for the set of devices. In some examples, the message generation component 860 may determine a subject, a communication message content, a set of keywords, or a combination thereof for the set of communication messages based on the communication information for the set of devices. In some examples, the message transmission component 825 may select a timing for transmitting the set of communication messages based on a likelihood of the set of communication messages being opened at the selected timing.

The notification component 865 may notify a user associated with the IP address that transmitting the set of communication messages has exceeded a send volume limit, that a device of the set of devices has unsubscribed or filed a communication message as spam, that a message opening rate has dropped, or any combination thereof. In some cases, the throttling component 870 may automatically update the set of transmission thresholds corresponding to the set of time durations for transmitting communication messages based on a set of rules and based on transmitting the set of communication messages having exceeded the send volume limit, the device of the set of devices having unsubscribed or filed the communication message as spam, the message opening rate having dropped, or any combination thereof.

In some examples, the schedule generator 820 may determine, for a first time duration for transmitting communication messages, a first transmission threshold for transmitting a first subset of communication messages of the set of communication messages, where transmitting the set of communication messages includes transmitting the first subset of communication messages during the first time duration. The communication information component 815 may determine additional communication information for the first subset of communication messages based on transmitting the first subset of communication messages. The schedule generator 820 may determine, for a second time duration subsequent to the first time duration, a second transmission threshold for transmitting a second subset of communication messages of the set of communication messages based on the additional communication information for the first subset of communication messages.

The machine reinforcement learning component 875 may identify that the target number of communication messages includes a send volume increase for the IP address and may input the send volume increase, communication message placement data, communication history for the set of devices, or a combination thereof into a machine learning model. The machine reinforcement learning component 875 may determine that the send volume increase negatively impacts a sender reputation score for the IP address based on an output of the machine learning model, where the set of transmission thresholds corresponding to the set of time durations for transmitting communication messages is generated based on the send volume increase negatively impacting the sender reputation score for the IP address. In some examples, the machine reinforcement learning component 875 may tune the machine learning model based on feedback information from one or more ISPs.

Figure 9:
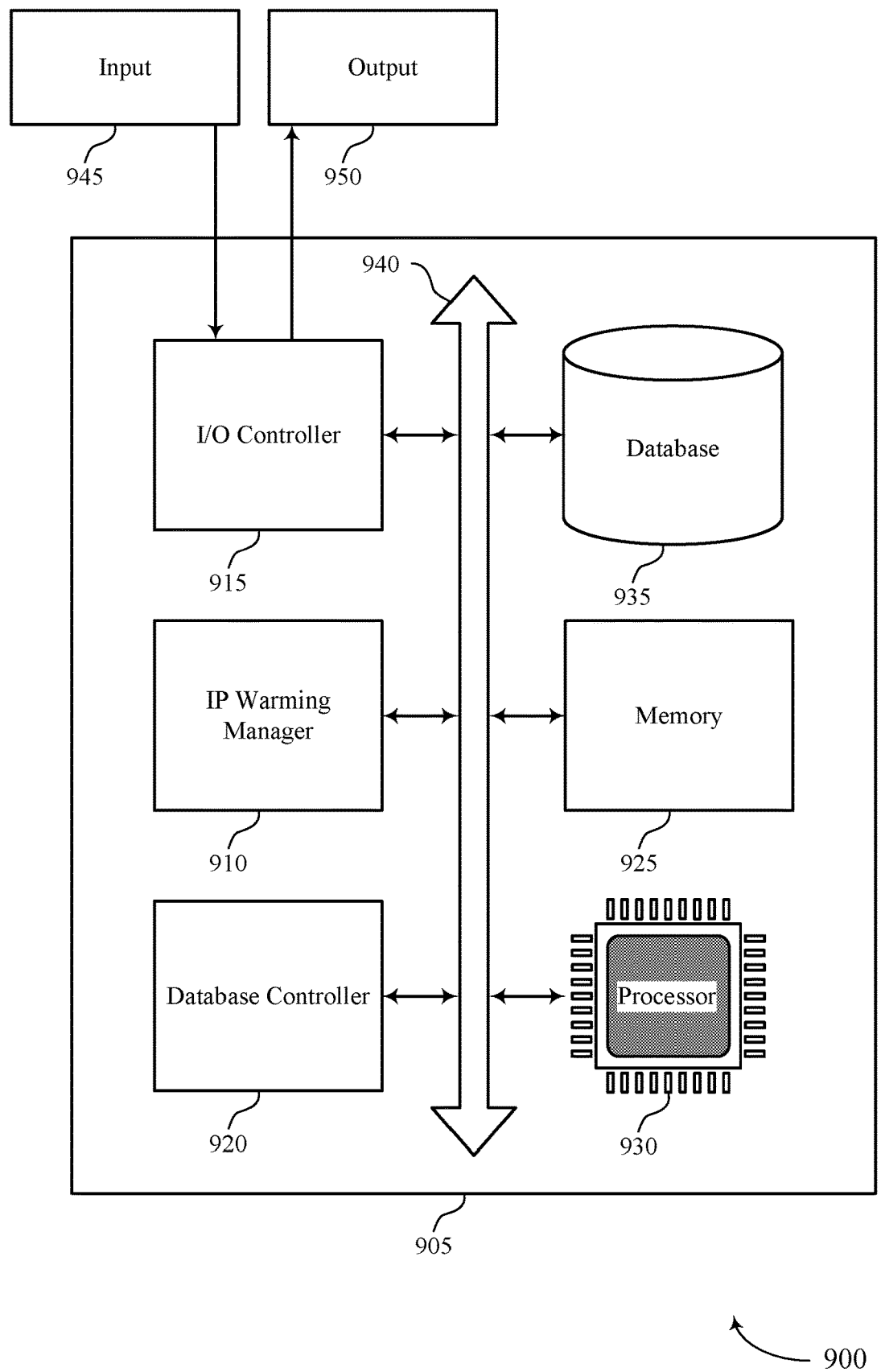
FIG. 9 shows a diagram of a system including a device that supports automated IP warming in accordance with aspects of the present disclosure.

FIG. 9 shows a diagram of a system 900 including a device 905 that supports automated IP warming in accordance with aspects of the present disclosure. The device 905 may be an example of or include the components of an application server or an apparatus 705 as described herein.

The device 905 may include components for bi-directional data communications including components for transmitting and receiving communications, including an IP warming manager 910, an I/O controller 915, a database controller 920, memory 925, a processor 930, and a database 935. These components may be in electronic communication via one or more buses (e.g., bus 940).

The IP warming manager 910 may be an example of an IP warming manager 715 or 805 as described herein. For example, the IP warming manager 910 may perform any of the methods or processes described above with reference to FIGS. 7 and 8. In some cases, the IP warming manager 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic I/O system (BIOS) which may control basic hardware or software operation such as the interaction with peripheral components or devices.

The processor 930 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting automated IP warming).

Figure 10:
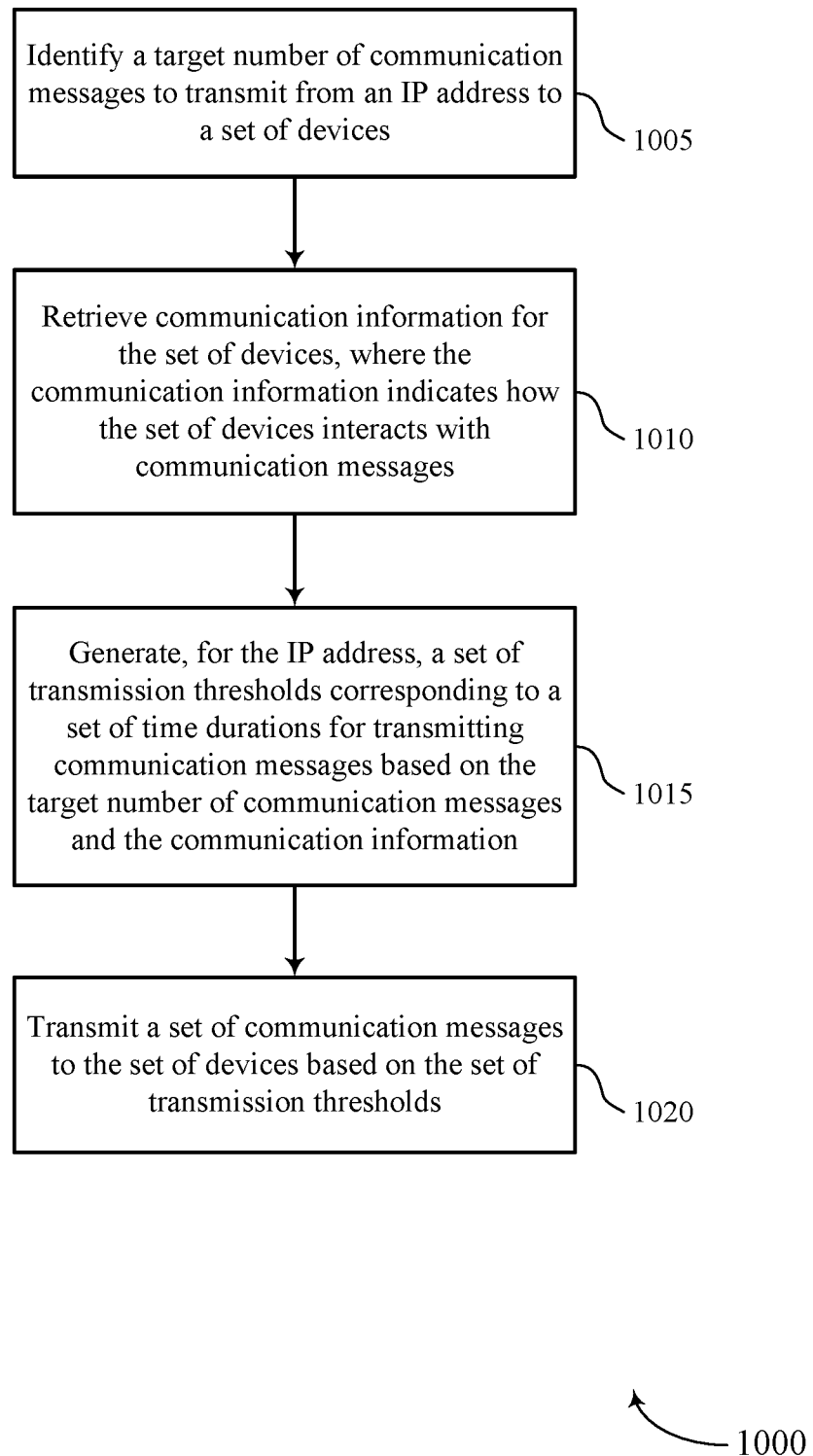
FIGS. 10 through 12 show flowcharts illustrating methods that support automated IP warming in accordance with aspects of the present disclosure.

FIG. 10 shows a flowchart illustrating a method 1000 that supports automated IP warming in accordance with aspects of the present disclosure. The operations of method 1000 may be implemented by an application server or its components as described herein. For example, the operations of method 1000 may be performed by an IP warming manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1005, the application server may identify, by a computer processor, a target number of communication messages to transmit from an IP address to a set of devices. The operations of 1005 may be performed according to the methods described herein. In some examples, aspects of the operations of 1005 may be performed by a target component as described with reference to FIGS. 7 through 9.

At 1010, the application server may retrieve, by the computer processor, communication information for the set of devices, where the communication information indicates how the set of devices interacts with communication messages. The operations of 1010 may be performed according to the methods described herein. In some examples, aspects of the operations of 1010 may be performed by a communication information component as described with reference to FIGS. 7 through 9.

At 1015, the application server may generate, by the computer processor and for the IP address, a set of transmission thresholds corresponding to a set of time durations for transmitting communication messages based on the target number of communication messages and the communication information. The operations of 1015 may be performed according to the methods described herein. In some examples, aspects of the operations of 1015 may be performed by a schedule generator as described with reference to FIGS. 7 through 9.

At 1020, the application server may transmit, by the computer processor, a set of communication messages to the set of devices based on the set of transmission thresholds. The operations of 1020 may be performed according to the methods described herein. In some examples, aspects of the operations of 1020 may be performed by a message transmission component as described with reference to FIGS. 7 through 9.

Figure 11:
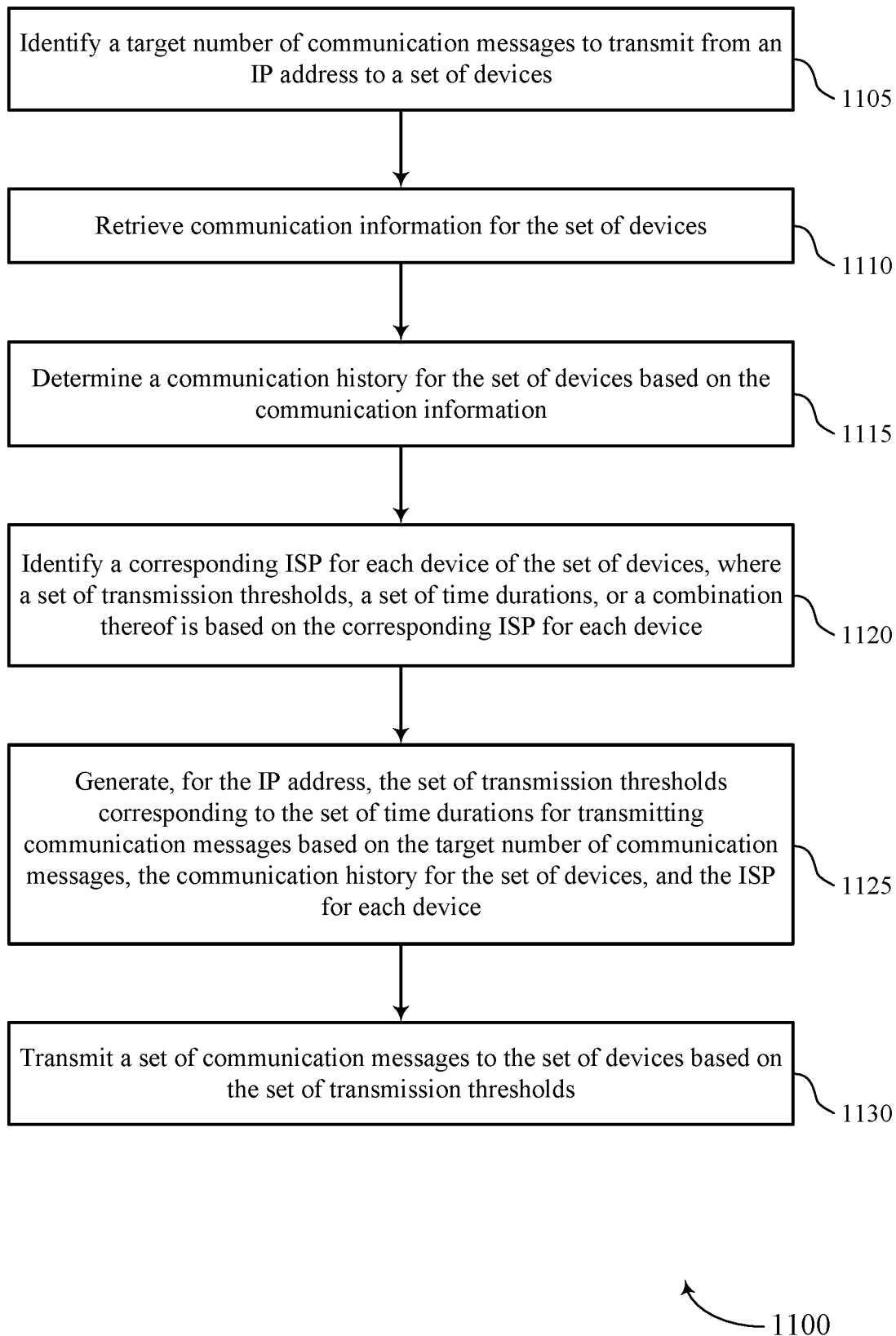

FIG. 11 shows a flowchart illustrating a method 1100 that supports automated IP warming in accordance with aspects of the present disclosure. The operations of method 1100 may be implemented by an application server or its components as described herein. For example, the operations of method 1100 may be performed by an IP warming manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1105, the application server may identify a target number of communication messages to transmit from an IP address to a set of devices. The operations of 1105 may be performed according to the methods described herein. In some examples, aspects of the operations of 1105 may be performed by a target component as described with reference to FIGS. 7 through 9.

At 1110, the application server may retrieve communication information for the set of devices, where the communication information indicates how the set of devices interacts with communication messages. The operations of 1110 may be performed according to the methods described herein. In some examples, aspects of the operations of 1110 may be performed by a communication information component as described with reference to FIGS. 7 through 9.

At 1115, the application server may determine a communication history for the set of devices based on the communication information, where the communication history indicates how the set of devices interacts with communication messages based on whether previous communication messages were read, unread, saved, deleted, sent to a spam folder, blocked, replied to, forwarded, or a combination thereof. The operations of 1115 may be performed according to the methods described herein. In some examples, aspects of the operations of 1115 may be performed by a communication information component as described with reference to FIGS. 7 through 9.

At 1120, the application server may identify a corresponding ISP for each device of the set of devices, where a set of transmission thresholds, a set of time durations, or a combination thereof is based on the corresponding ISP for each device. The operations of 1120 may be performed according to the methods described herein. In some examples, aspects of the operations of 1120 may be performed by an ISP component as described with reference to FIGS. 7 through 9.

At 1125, the application server may generate, for the IP address, the set of transmission thresholds corresponding to the set of time durations for transmitting communication messages based on the target number of communication messages and the communication information. The operations of 1125 may be performed according to the methods described herein. In some examples, aspects of the operations of 1125 may be performed by a schedule generator as described with reference to FIGS. 7 through 9.

At 1130, the application server may transmit a set of communication messages to the set of devices based on the set of transmission thresholds. The operations of 1130 may be performed according to the methods described herein. In some examples, aspects of the operations of 1130 may be performed by a message transmission component as described with reference to FIGS. 7 through 9.

Figure 12:
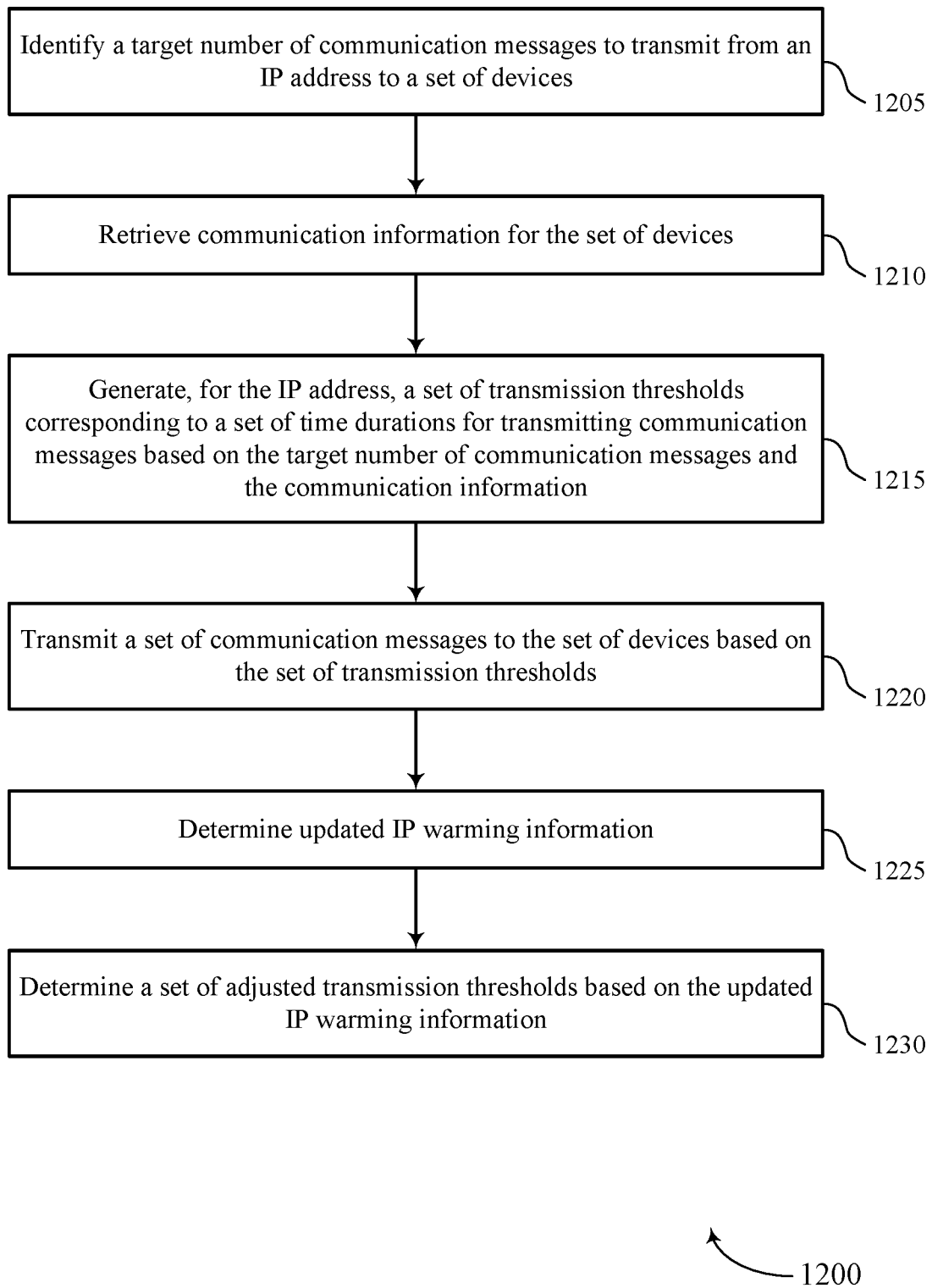

FIG. 12 shows a flowchart illustrating a method 1200 that supports automated IP warming in accordance with aspects of the present disclosure. The operations of method 1200 may be implemented by an application server or its components as described herein. For example, the operations of method 1200 may be performed by an IP warming manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1205, the application server may identify a target number of communication messages to transmit from an IP address to a set of devices. The operations of 1205 may be performed according to the methods described herein. In some examples, aspects of the operations of 1205 may be performed by a target component as described with reference to FIGS. 7 through 9.

At 1210, the application server may retrieve communication information for the set of devices, where the communication information indicates how the set of devices interacts with communication messages. The operations of 1210 may be performed according to the methods described herein. In some examples, aspects of the operations of 1210 may be performed by a communication information component as described with reference to FIGS. 7 through 9.

At 1215, the application server may generate, for the IP address, a set of transmission thresholds corresponding to a set of time durations for transmitting communication messages based on the target number of communication messages and the communication information. The operations of 1215 may be performed according to the methods described herein. In some examples, aspects of the operations of 1215 may be performed by a schedule generator as described with reference to FIGS. 7 through 9.

At 1220, the application server may transmit a set of communication messages to the set of devices based on the set of transmission thresholds. The operations of 1220 may be performed according to the methods described herein. In some examples, aspects of the operations of 1220 may be performed by a message transmission component as described with reference to FIGS. 7 through 9.

At 1225, the application server may determine updated IP warming information, where the updated IP warming information includes updated communication information for the set of devices based on how the set of devices interacts with the set of communication messages, updated ISP tracking data, updated sender reputation data for the IP address, or a combination thereof. The operations of 1225 may be performed according to the methods described herein. In some examples, aspects of the operations of 1225 may be performed by a schedule updating component as described with reference to FIGS. 7 through 9.

At 1230, the application server may determine a set of adjusted transmission thresholds based on the updated IP warming information. The operations of 1230 may be performed according to the methods described herein. In some examples, aspects of the operations of 1230 may be performed by a schedule updating component as described with reference to FIGS. 7 through 9.

A method for IP warming is described. The method may include identifying, by a computer processor, a target number of communication messages to transmit from an IP address to a set of devices; retrieving, by the computer processor, communication information for the set of devices, where the communication information indicates how the set of devices interacts with communication messages; generating, by the computer processor and for the IP address, a set of transmission thresholds corresponding to a set of time durations for transmitting communication messages based on the target number of communication messages and the communication information; and transmitting, by the computer processor, a set of communication messages to the set of devices based on the set of transmission thresholds.

An apparatus for IP warming is described. The apparatus may include a processor, memory coupled with the processor, and instructions stored in the memory. The instructions may be executable by the processor to cause the apparatus to identify, by the processor, a target number of communication messages to transmit from an IP address to a set of devices; retrieve, by the processor, communication information for the set of devices, where the communication information indicates how the set of devices interacts with communication messages; generate, by the processor and for the IP address, a set of transmission thresholds corresponding to a set of time durations for transmitting communication messages based on the target number of communication messages and the communication information; and transmit, by the processor, a set of communication messages to the set of devices based on the set of transmission thresholds.

Another apparatus for IP warming is described. The apparatus may include means for identifying, by a computer processor, a target number of communication messages to transmit from an IP address to a set of devices; means for retrieving, by the computer processor, communication information for the set of devices, where the communication information indicates how the set of devices interacts with communication messages; means for generating, by the computer processor and for the IP address, a set of transmission thresholds corresponding to a set of time durations for transmitting communication messages based on the target number of communication messages and the communication information; and means for transmitting, by the computer processor, a set of communication messages to the set of devices based on the set of transmission thresholds.

A non-transitory computer-readable medium storing code for IP warming is described. The code may include instructions executable by a processor to identify, by a computer processor, a target number of communication messages to transmit from an IP address to a set of devices; retrieve, by the computer processor, communication information for the set of devices, where the communication information indicates how the set of devices interacts with communication messages; generate, by the computer processor and for the IP address, a set of transmission thresholds corresponding to a set of time durations for transmitting communication messages based on the target number of communication messages and the communication information; and transmit, by the computer processor, a set of communication messages to the set of devices based on the set of transmission thresholds.

Some examples of the method, apparatuses, and non-transitory computer-readable medium described herein may further include operations, features, means, or instructions for identifying a corresponding ISP for each device of the set of devices, where the set of transmission thresholds, the set of time durations, or a combination thereof may be based on the corresponding ISP for each device.

Some examples of the method, apparatuses, and non-transitory computer-readable medium described herein may further include operations, features, means, or instructions for determining a communication history for the set of devices based on the communication information, where the communication history indicates how the set of devices interacts with communication messages based on whether previous communication messages were read, unread, saved, deleted, sent to a spam folder, blocked, replied to, forwarded, or a combination thereof.

Some examples of the method, apparatuses, and non-transitory computer-readable medium described herein may further include operations, features, means, or instructions for identifying one or more contact policies for transmitting communication messages, where the set of transmission thresholds, the set of time durations, or a combination thereof may be based on the one or more contact policies for transmitting communication messages.

Some examples of the method, apparatuses, and non-transitory computer-readable medium described herein may further include operations, features, means, or instructions for determining priority values for the set of devices based on the communication information for the set of devices, where the set of transmission thresholds may be based on the priority values for the set of devices.

In some examples of the method, apparatuses, and non-transitory computer-readable medium described herein, transmitting the set of communication messages may include operations, features, means, or instructions for transmitting, during a first time duration, a first set of communication messages of the set of communication messages to a first subset of devices of the set of devices with a first priority value and transmitting, during a second time duration subsequent to the first time duration, a second set of communication messages of the set of communication messages to a second subset of devices of the set of devices with a second priority value less than the first priority value.

Some examples of the method, apparatuses, and non-transitory computer-readable medium described herein may further include operations, features, means, or instructions for determining updated IP warming information, where the updated IP warming information includes updated communication information for the set of devices based on how the set of devices interacts with the set of communication messages, updated ISP tracking data, updated sender reputation data for the IP address, or a combination thereof, and determining a set of adjusted transmission thresholds based on the updated IP warming information.

Some examples of the method, apparatuses, and non-transitory computer-readable medium described herein may further include operations, features, means, or instructions for validating email addresses for the set of devices prior to transmitting the set of communication messages to the set of devices.

Some examples of the method, apparatuses, and non-transitory computer-readable medium described herein may further include operations, features, means, or instructions for receiving, at the computer processor and from a user, a modification to the set of transmission thresholds, where the set of communication messages may be transmitted based on the modification.

Some examples of the method, apparatuses, and non-transitory computer-readable medium described herein may further include operations, features, means, or instructions for generating a communications report for the set of communication messages based on how the set of devices interact with the set of communication messages and sending the communications report for display on a user interface.

Some examples of the method, apparatuses, and non-transitory computer-readable medium described herein may further include operations, features, means, or instructions for generating the set of communication messages based on the communication information for the set of devices.

Some examples of the method, apparatuses, and non-transitory computer-readable medium described herein may further include operations, features, means, or instructions for determining a subject, a communication message content, a set of keywords, or a combination thereof for the set of communication messages based on the communication information for the set of devices.

Some examples of the method, apparatuses, and non-transitory computer-readable medium described herein may further include operations, features, means, or instructions for selecting a timing for transmitting the set of communication messages based on a likelihood of the set of communication messages being opened at the selected timing.

Some examples of the method, apparatuses, and non-transitory computer-readable medium described herein may further include operations, features, means, or instructions for notifying a user associated with the IP address that transmitting the set of communication messages has exceeded a send volume limit, that a device of the set of devices has unsubscribed or filed a communication message as spam, that a message opening rate has dropped, or any combination thereof.

Some examples of the method, apparatuses, and non-transitory computer-readable medium described herein may further include operations, features, means, or instructions for automatically updating the set of transmission thresholds corresponding to the set of time durations for transmitting communication messages based on a set of rules and transmitting the set of communication messages having exceeded the send volume limit, the device of the set of devices having unsubscribed or filed the communication message as spam, the message opening rate having dropped, or any combination thereof.

Some examples of the method, apparatuses, and non-transitory computer-readable medium described herein may further include operations, features, means, or instructions for determining, for a first time duration for transmitting communication messages, a first transmission threshold for transmitting a first subset of communication messages of the set of communication messages, where transmitting the set of communication messages includes transmitting the first subset of communication messages during the first time duration; determining additional communication information for the first subset of communication messages based on transmitting the first subset of communication messages; and determining, for a second time duration subsequent to the first time duration, a second transmission threshold for transmitting a second subset of communication messages of the set of communication messages based on the additional communication information for the first subset of communication messages.

Some examples of the method, apparatuses, and non-transitory computer-readable medium described herein may further include operations, features, means, or instructions for identifying that the target number of communication messages includes a send volume increase for the IP address; inputting the send volume increase, communication message placement data, communication history for the set of devices, or a combination thereof into a machine learning model; determining that the send volume increase negatively impacts a sender reputation score for the IP address based on an output of the machine learning model, where the set of transmission thresholds corresponding to the set of time durations for transmitting communication messages may be generated based on the send volume increase negatively impacting the sender reputation score for the IP address; and tuning the machine learning model based on feedback information from one or more ISPs.

Some examples of the method, apparatuses, and non-transitory computer-readable medium described herein may further include operations, features, means, or instructions for tracking a reputation score for an IP address associated with a device of the set of devices, where the set of transmission thresholds, the set of time durations, or a combination thereof may be based on the reputation score for the IP address.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for internet protocol (IP) warming, comprising:
   identifying a target number of communication messages to transmit from an IP address to a set of devices;
   retrieving communication information for the set of devices, wherein the communication information indicates how the set of devices interacts with one or more previous communication messages;
   identifying an internet service provider (ISP) for one or more devices of the set of devices;
   generating a plurality of transmission thresholds for the IP address based at least in part on the identified ISP, a rate of send volume increase defining an incremental increase in a number of communication messages, the target number of communication messages, and the communication information, wherein a transmission threshold of the plurality of transmission thresholds indicates a threshold number of the target number of communication messages to transmit within a time duration of a plurality of time durations;
   transmitting, during a first time duration of the plurality of time durations, a first subset of the target number of communication messages to the set of devices;
   receiving feedback information from the set of devices in response to transmitting the first subset of the target number of communication messages; and
   transmitting, during a second time duration following the first time duration, a second subset of the target number of communication messages to the set of devices based at least in part on the feedback information and the incremental increase in the number of communication messages indicated by the rate of send volume increase.

2. The method of claim 1, further comprising:
   identifying a corresponding ISP for each device of the set of devices, wherein the plurality of transmission thresholds, the plurality of time durations, or a combination thereof is based at least in part on the corresponding ISP for each device.

3. The method of claim 1, further comprising:
   determining a communication history for the set of devices based at least in part on the communication information, wherein the communication history indicates how the set of devices interacts with the one or more previous communication messages based at least in part on whether the one or more previous communication messages were read, unread, saved, deleted, sent to a spam folder, blocked, replied to, forwarded, or a combination thereof.

4. The method of claim 1, further comprising:
   identifying one or more contact policies for transmitting communication messages, wherein the plurality of transmission thresholds, the plurality of time durations, or a combination thereof is based at least in part on the one or more contact policies for transmitting communication messages.

5. The method of claim 1, further comprising:
   determining priority values for the set of devices based at least in part on the communication information for the set of devices, wherein the plurality of transmission thresholds is based at least in part on the priority values for the set of devices.

6. The method of claim 5, wherein transmitting the first subset of the target number of communication messages comprises:
   transmitting, during the first time duration, the first subset of the target number of communication messages to a first subset of devices of the set of devices with a first priority value; and
   transmitting, during the second time duration subsequent to the first time duration, the second subset of the target number of communication messages to a second subset of devices of the set of devices with a second priority value less than the first priority value.

7. The method of claim 1, further comprising:
   determining updated IP warming information, wherein the updated IP warming information comprises updated communication information for the set of devices based at least in part on how the set of devices interacts with the first subset of the target number of communication messages, updated internet service provider (ISP) tracking data, updated sender reputation data for the IP address, or a combination thereof; and
   determining a plurality of adjusted transmission thresholds based at least in part on the updated IP warming information.

8. The method of claim 1, further comprising:
   validating email addresses for the set of devices prior to transmitting the first subset of the target number of communication messages to the set of devices.

9. The method of claim 1, further comprising:
   receiving, from a user, a modification to the plurality of transmission thresholds, wherein the first subset of the target number of communication messages is transmitted based at least in part on the modification.

10. The method of claim 1, further comprising:
    generating a communications report for the first subset of the target number of communication messages based at least in part on how the set of devices interact with the first subset of the target number of communication messages; and
    sending the communications report for display on a user interface.

11. The method of claim 1, further comprising:
generating the first subset of the target number of communication messages based at least in part on the communication information for the set of devices.

12. The method of claim 11, further comprising:
determining a subject, a communication message content, a set of keywords, or a combination thereof for the first subset of the target number of communication messages based at least in part on the communication information for the set of devices.

13. The method of claim 1, further comprising:
selecting a timing for transmitting the first subset of the target number of communication messages based at least in part on a likelihood of the first subset of the target number of communication messages being opened at the selected timing.

14. The method of claim 1, further comprising:
notifying a user associated with the IP address that transmitting the first subset of the target number of communication messages has exceeded a send volume limit, that a device of the set of devices has unsubscribed or filed a communication message as spam, that a message opening rate has dropped, or any combination thereof.

15. The method of claim 14, further comprising:
automatically updating the plurality of transmission thresholds based at least in part on a set of rules and transmitting the first subset of the target number of communication messages having exceeded the send volume limit, the device of the set of devices having unsubscribed or filed the communication message as spam, the message opening rate having dropped, or any combination thereof.

16. The method of claim 1, further comprising:
determining, for the first time duration, a first transmission threshold for transmitting the first subset of the target number of communication messages;
determining additional communication information for the first subset of the target number of communication messages based at least in part on transmitting the first subset of the target number of communication messages; and
determining, for the second time duration subsequent to the first time duration, a second transmission threshold for transmitting the second subset of the target number of communication messages based at least in part on the additional communication information for the first subset of the target number of communication messages.

17. The method of claim 1, further comprising:
identifying that the target number of communication messages comprises a send volume increase for the IP address;
inputting the send volume increase, communication message placement data, communication history for the set of devices, or a combination thereof into a machine learning model;
determining that the send volume increase negatively impacts a sender reputation score for the IP address based at least in part on an output of the machine learning model, wherein the plurality of transmission thresholds is generated based at least in part on the send volume increase negatively impacting the sender reputation score for the IP address; and
tuning the machine learning model based at least in part on the feedback information from one or more internet service providers (ISPs).

18. The method of claim 1, further comprising:
tracking a reputation score for an IP address associated with a device of the set of devices, wherein the plurality of transmission thresholds, the plurality of time durations, or a combination thereof is based at least in part on the reputation score for the IP address associated with the device of the set of devices.

19. An apparatus for internet protocol (IP) warming, comprising:
a processor;
memory coupled with the processor; and
instructions stored in the memory and executable by the processor to cause the apparatus to:
identify a target number of communication messages to transmit from an IP address to a set of devices;
retrieve communication information for the set of devices, wherein the communication information indicates how the set of devices interacts with one or more previous communication messages;
identify an internet service provider (ISP) for one or more devices of the set of devices;
generate a plurality of transmission thresholds for the IP address based at least in part on the identified ISP, a rate of send volume increase defining an incremental increase in a number of communication messages, the target number of communication messages, and the communication information, wherein a transmission threshold of the plurality of transmission thresholds indicates a threshold number of the target number of communication messages to transmit within a time duration of a plurality of time durations;
transmit, during a first time duration of the plurality of time durations, a first subset of the target number of communication messages to the set of devices;
receive feedback information from the set of devices in response to transmitting the first subset of the target number of communication messages; and
transmit, during a second time duration following the first time duration, a second subset of the target number of communication messages to the set of devices based at least in part on the feedback information and the incremental increase in the number of communication messages indicated by the rate of send volume increase.

20. A non-transitory computer-readable medium storing code for internet protocol (IP) warming, the code comprising instructions executable by a computer processor to:
identify a target number of communication messages to transmit from an IP address to a set of devices;
retrieve communication information for the set of devices, wherein the communication information indicates how the set of devices interacts with one or more previous communication messages;
identify an internet service provider (ISP) for one or more devices of the set of devices;
generate a plurality of transmission thresholds for the IP address based at least in part on the identified ISP, a rate of send volume increase defining an incremental increase in a number of communication messages, the target number of communication messages, and the communication information, wherein a transmission threshold of the plurality of transmission thresholds indicates a threshold number of the target number of communication messages to transmit within a time duration of a plurality of time durations;
transmit, during a first time duration of the plurality of time durations, a first subset of the target number of communication messages to the set of devices;

receive feedback information from the set of devices in response to transmitting the first subset of the target number of communication messages; and transmit, during a second time duration following the first time duration, a second subset of the target number of communication messages to the set of devices based at least in part on the feedback information and the incremental increase in the number of communication messages indicated by the rate of send volume increase.

\* \* \* \* \*